| (12) United States Patent | (10) Patent No.: | US 6,678,411 B1 |
| Crill | (45) Date of Patent: | Jan. 13, 2004 |

(54) APPARATUS AND METHOD FOR CHARACTERIZING, ENCODING, STORING, AND SEARCHING IMAGES BY SHAPE

(75) Inventor: Rikk Crill, Longmont, CO (US)

(73) Assignee: Look Dynamics, Inc., Longmont, CO (US)

( * ) Notice: Subject to any disclaimer, the term of this patent is extended or adjusted under 35 U.S.C. 154(b) by 0 days.

(21) Appl. No.: 09/536,426

(22) Filed: Mar. 27, 2000

Related U.S. Application Data

(63) Continuation-in-part of application No. 09/326,362, filed on Jun. 4, 1999.

(51) Int. Cl.⁷ .................................................. G06K 9/00
(52) U.S. Cl. ......................................... 382/181; 359/559
(58) Field of Search ............................... 382/181, 276, 382/278, 182, 183, 196, 232, 234, 248, 127, 124; 359/10, 561, 11, 12, 559; 356/450, 451, 319, 341

(56) References Cited

U.S. PATENT DOCUMENTS

| 3,771,124 A | * | 11/1973 | McMahon ............... 340/146.3 |
| 3,891,968 A | | 6/1975 | McMahon ............... 340/146.3 |
| 4,218,623 A | * | 8/1980 | Utagawa ..................... 250/578 |
| 5,216,541 A | * | 6/1993 | Takesue et al. ............. 359/561 |
| 5,224,173 A | * | 6/1993 | Kuhns et al. ............... 382/116 |
| 5,479,303 A | | 12/1995 | Suzuki et al. ............... 360/72.2 |
| 5,659,637 A | * | 8/1997 | Bagley, Jr. et al. ......... 382/278 |
| 5,761,655 A | | 6/1998 | Hoffman ......................... 707/4 |
| 5,796,435 A | | 8/1998 | Nonomura et al. ......... 348/405 |
| 5,802,361 A | | 9/1998 | Wang et al. ................. 395/600 |
| 5,815,598 A | | 9/1998 | Hara et al. .................. 382/211 |
| 5,867,600 A | | 2/1999 | Hongu ........................ 382/247 |
| 5,915,250 A | | 6/1999 | Jain et al. ................... 707/100 |
| 5,987,183 A | | 11/1999 | Saunders et al. ........... 382/239 |
| 6,026,416 A | | 2/2000 | Kanerva et al. ............. 707/515 |

OTHER PUBLICATIONS

McMahon, D.H. et al.; "A Hybrid Optical Computer Processing Technique For Fingerprint Identification", IEEE Transactions on Computers, Apr. 1975, vol. C–24, No. 4, pp. 358–369.

* cited by examiner

*Primary Examiner*—Jayanti K. Patel
*Assistant Examiner*—Seyed Azarian
(74) *Attorney, Agent, or Firm*—James R. Young; Faegre & Benson

(57) ABSTRACT

An optical image characterizer 10 detects light energy as discrete angular orientations of a slit in a rotating spatial filter positioned at the focal plane of a Fourier transform lens, where a Fourier transform pattern of spatial frequencies of an image are formed. Detection of light energy with a small array (e.g., 16×16) photodetector is enhanced by splitting the beam containing the filtered light energy pattern and projecting it onto two photodetector arrays in offset, virtual juxtaposed relation to each other. Detected light intensities I at discrete angular orientations R are stored in RIXel data arrays with or without searchable flags X, such as distortion factors.

23 Claims, 8 Drawing Sheets

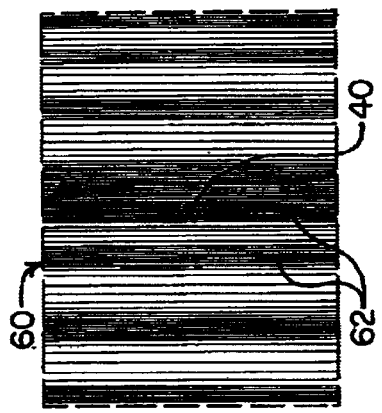
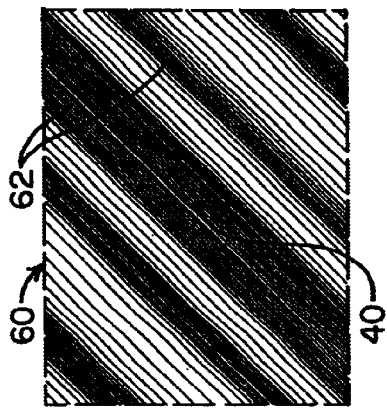
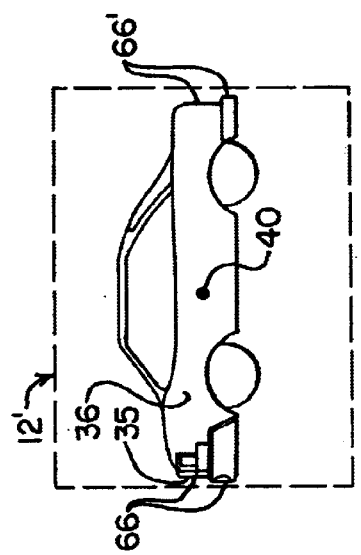
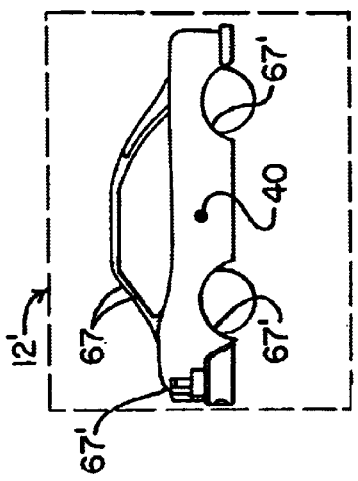
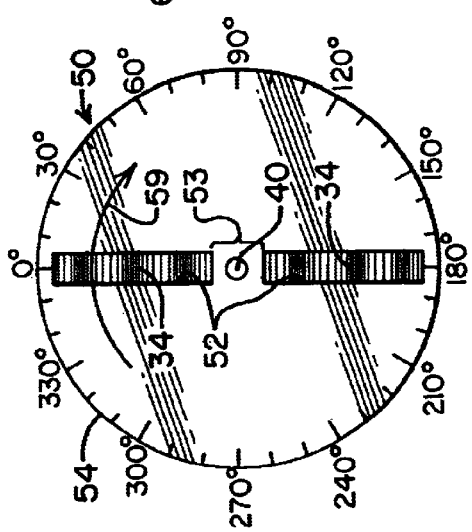
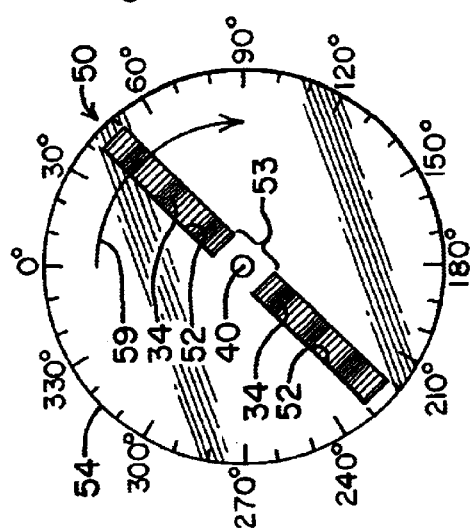

APPARATUS AND METHOD FOR CHARACTERIZING, ENCODING, STORING, AND SEARCHING IMAGES BY SHAPE

CROSS REFERENCE TO RELATED PATENT APPLICATION

This patent application is a continuation-in-part of U.S. patent application Ser. No. 09/326,362, filed in the U.S. Patent and Trademark Office on Jun. 4, 1999.

BACKGROUND OF THE INVENTION

1. Field of the Invention

This invention relates generally to optical image processing and more particularly characterizing images optically in a way that can be encoded, stored, searched, retrieved, and/or compared to other images.

2. State of the Prior Art

There are hundreds of millions, perhaps billions, of creative works in the world which are in the form of visual images or which can be converted into visual images. Such creative works may include, for example, artistic drawings and paintings, commercial art, technical drawings, photographs, motion pictures, digitally recorded still and video motion images, radar images, maps, computer-generated images, literary works, graphics software code, sound recordings, and many more. Such creative works are stored in libraries, data bases, public and private collections, and other places all over the world, and there are many reasons for persons wanting to find them. However, images are much more difficult than, for example, text, to characterize in an objective manner, independent of human viewing and subjective evaluation. Therefore, creation of a comprehensive data base for storing and searching large numbers of images has been a daunting task and the results have limited utility, even when augmented by computerized indexing and searching. For example, a visual search engine implemented by ditto.com (formerly Arriba Soft Corp.) uses a "crawler" computer software program to travel the World Wide Web, visiting web sites in search of images, and capturing the images along with any related text. The images are then reduced in size, indexed with the text according to some category of subject matter, content, characteristic, or the like, screened and/or chosen by humans ("human filters"); and entered into a data base. Subsequent access or searching of the data base is done by entering a key word or phrase, which has to be one of a number of key words or phrases that the search engine architect or operator has chosen to characterize an image in the search engine index. For example, a searcher could enter the word "butterfly" and, if the data base search engine has images indexed by the word "butterfly," the search engine will display those images. If the search under "butterfly" yields too many hits, e.g. over 3000 images, another word, such as "monarch" can be added to narrow the search field, but only if the data base architect or operator has images indexed under the word "monarch". The words "monarch butterfly" may narrow the field t to, e.g., several hundred images. It is then up to the human viewer to look at all the images catalogued under the words "monarch" and "butterfly" to see if there is one or more of interest. Ultimately, the search capability of such a search engine is limited by: (i) the word(s) the data base architect or operator choose to describe an image; (ii) the limited time that real people have to view the images, assign key words for indexing, and enter the image with the chosen index words in the data base—currently up to several million images; (iii) the limited images from the hundreds of millions or billions available that the operator decides to index and put into the data base; (iv) the user has to personally view the images presented; and (v) if the user wants to find the source or location of an image of which the user has a reference image that the user has in his/her possession, the user has to hope the search engine operator did not exclude the wanted image, and the user has to compare the images delivered by the search engine to the reference image.

Applicant's co-pending patent application, U.S. Ser. No. 09/326,362, filed Jun. 4, 1999, now U.S. Pat. No. 6,445,822 describes how images can be found in various data bases, servers, web sites, and the like that are accessible by or via the Internet and compared to a reference image using optical correlation techniques. However, it is not very desirable or efficient to have to search through all such available sources each time a match is sought for a different reference image. Of course, all of the images found in all such available sources could be placed into a single or central data base, and then each search for a match to a reference image could be searched in that data base. Such a scheme would eliminate having to go to all available sources for each search. However, many images require hundreds or thousands of kilobytes of data, so it would require a massive data storage memory to gather and store the hundreds of millions or billions of images together in one data base, and searching through all such images for every reference image would still be inefficient, even if all the images were in a single data base. Yet, attempts to limit searching time and resource requirements by arbitrary categories, while possibly beneficial to a limited extent, imposes at least some of the limitations and inefficiencies described above in relation to the ditto.com types of image search engines. Applicant's copending patent application, Ser. No. 09/326,362, now U.S. Pat. No. 6,445,822 does not address how images found in such various data bases, servers, web sites, and the like could be characterized in a manner that requires minimal data or bytes of information for easy and manageable data base storage, quick searching, and ready retrieval for match comparisons.

There is a need for a more automated, high-speed apparatus and method for characterizing images in a manner that can be stored, searched, retrieved, and compared to a reference image with minimal, if any, human intervention or participation.

SUMMARY OF THE INVENTION

Accordingly, it is a general object of this invention to provide an improved apparatus and method for characterizing images with information that is unique for each image and that is suitable for encoding, storing, and searching in a data base.

A more specific object of this invention is to provide a method for characterizing shapes in an image quickly and encoding such shape-related characteristics with minimal data so that data storage, searching, and retrieval can be done fast and without extraordinary computer processing power and memory capacity.

Another specific object of the invention is to provide automated search and retrieval of an image from a data base of images based on a reference image.

This and other objects, advantages, and novel features of the invention shall be set forth in part in the description that follows, and in part will become apparent to those skilled in the art upon examination of the following description or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly describe herein, the method of this invention includes characterizing an image for shape content by creating an optical Fourier transform pattern of the image with light energy, spatial filtering the light energy from the Fourier transform pattern with a rotating slit to create a filtered pattern of light energy, detecting intensities of light energy as it is distributed in the filtered pattern at discrete angular orientations of the slit, and storing the intensities of light energy detected in the spatial pattern along with the discrete angular orientation of the slit at which such intensities of light energy are detected. The invention also includes splitting the light energy distributed in the filtered pattern into two beams for detecting by two separate detector arrays that are offset in virtual relation to each other in reference to the filtered pattern in order to avoid losing light energy intensities in spots or zones of light energy that straddle boundaries between two or more individual photosensitive elements in one of the detector arrays. Processing and storing the light energy intensities include combining intensities from individual photosensitive elements with angular orientation of the slit for storage in spaces of a data array that correspond to positions of individual photosensitive elements in the detector array. The intensities can be measured against an intensity threshold and stored in the data base only if they are at least as high as the intensity threshold. A flag, such as one or more distortion levels can be added to the rotation and intensity information stored in the data array.

To further achieve the foregoing objects, the apparatus of this invention includes an optical image shape content characterizer comprising a Fourier transform lens for creating a Fourier transform pattern of light energy from the image at the focal plane of the lens, a spatial filter with a rotating slit positioned in the focal plane of the lens to pass only light energy from the Fourier transform pattern at angular orientations of the slit, a photodetector positioned to detect light passed by the spatial filter, and a spatial light modulator with an associated coherent light source. The spatial light modulator is addressable to produce an image with coherent light from the associated coherent light source and to project the image with the coherent light through the Fourier transform lens. The photodetector preferably includes two detector arrays of individual photosensitive elements, and a beam splitter projects a portion of the filtered pattern to one of the detector arrays and another portion to the other detector array. The detector arrays are virtually offset in relation to each other in reference to the filtered pattern. A comparator circuit (or software performing comparator function) selects intensity from among an individual photosensitive element in one of the arrays and a cluster of virtual partially juxtaposed photosensitive elements in the other array. A RIXel data base array is used to store intensities together with rotational orientation and, optionally, a searchable flag, such as a distortion factor.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings:

FIGS. 2a–c show the relationship between the vertical angular orientation of the slit in the spatial filter (FIG. 2a) in relation to the shape features in the image (FIG. 2b) and the resulting filtered pattern of light energy (FIG. 2c);

FIGS. 3a–c are similar to FIGS. 2a–c, but with the angular orientation of the slit at about 50 degrees from vertical;

DETAILED DESCRIPTION OF THE PREFERRED EMBODIMENTS

Figure 1:
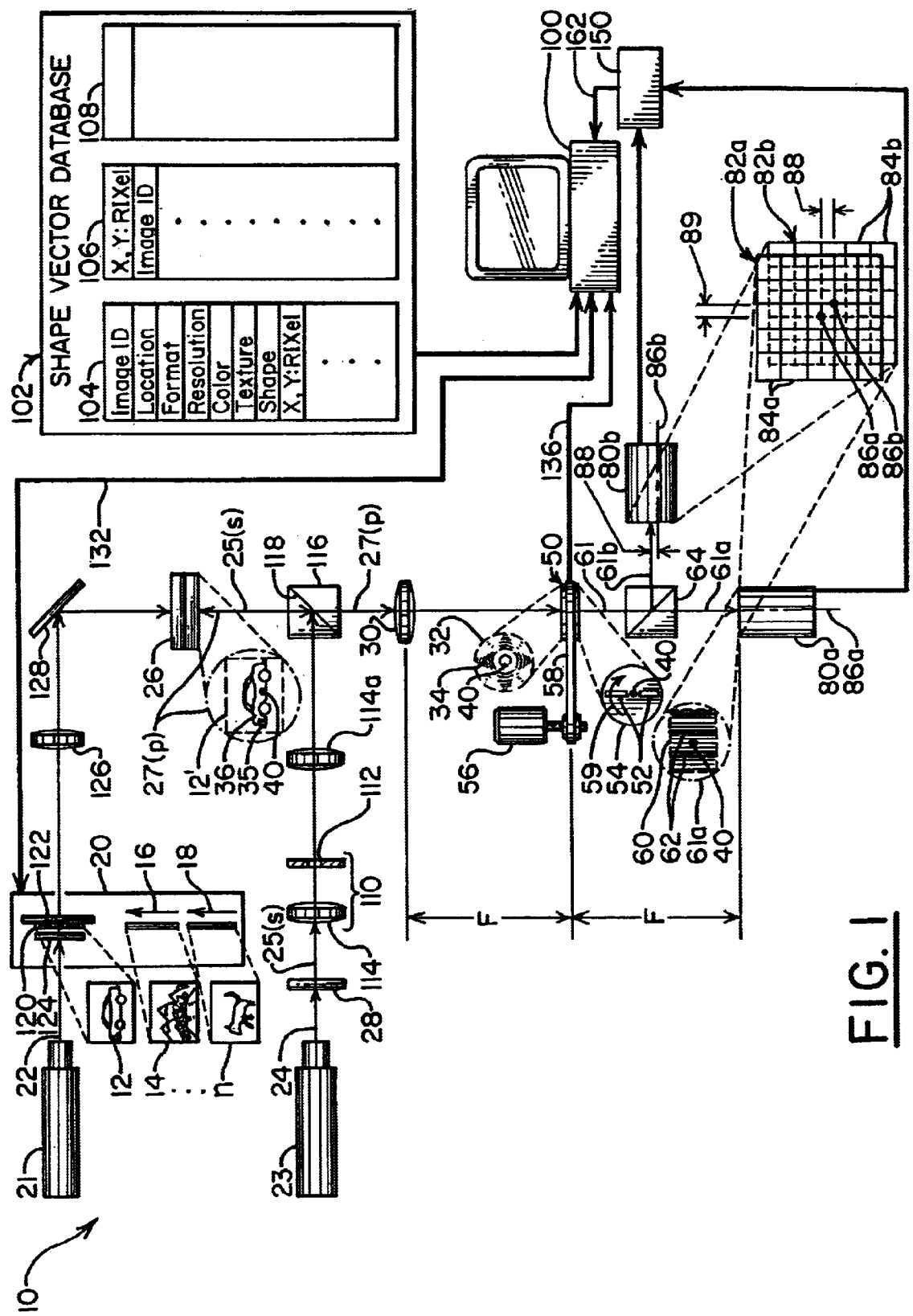
FIG. 1 is a schematic diagram of an optical image characterizer according to this invention.

An optical image characterizer 10 for characterizing, storing, and searching optical images by shape content according to the present invention is shown schematically in FIG. 1. This characterizer 10 characterizes an image according to the geometric shapes that comprise the image, and the characterization will be unique to the image. Other characterizations of the image, such as color and/or texture created with different optical apparatus that is not part of this invention can be used together with the shape characteristics acquired according to this invention further characterize and search images. However, this description will focus primarily on image shape content characterization according to this invention.

Essentially, a sample image 12, which can be obtained from any source (e.g., Internet, electronic data base, web site, library, scanner, photograph, film strip, radar image, electronic still or moving video camera, and other sources) is entered into the optical image shape characterizer 10, as will be described in more detail below. Any number n of other sample images 14, . . . , n, are shown in Figure queued for entry in sequence, as indicated by arrows 16, 18, into the optical image characterizer 10. Entry of any number n of such sequential images 12, 14, . . . , n can be done manually or, preferably, in an automated manner, such as a mechanical slide handler, a computer image generator, a film strip projector, an electronic still or video camera, or the like. The box 20 in FIG. 1 represents diagrammatically any apparatus capable of queuing and moving images 12, 14, . . . , n into the image characterizer 10. The description that follows will, for the most part, refer only to the first image 12 for convenience and simplicity, but with the understanding that it could apply as well to any image 12, 14, . . . , n.

Also, the several sample images 12, 14, . . . , n, are inserted into the optical images characterizer 10 in a plane that is perpendicular to the beam of light 22 emanating from the image illuminator 21, i.e., perpendicular to the plane of the view in FIG. 1. However, to facilitate explanation, illustration, and understanding of the invention, the images 12, 14,. . . , n are shown as projected into a plane parallel to the plane of the view in FIG. 1, i.e., parallel to the plane of the paper. This same convention is also used to project image 12', Fourier transfer pattern 32, spatial filter 10, filtered pattern 60, and detector grids 82a, 82b from their respective planes perpendicular to the light beams into the plane of the paper for purposes of explanation, illustration, and understanding. These components and their functions in the invention will be explained in more detail below.

An image 12 entered into the optical image characterizer 10 passes optical through a number of optical components, which will be described in more detail below. However, the image 12 will undergo a significant transformation upon passing through the thin, positive lens 30, also called the Fourier transform (FT) lens. A Fourier transform of the sample image 12' rearranges the light energy of the image 12' into a Fourier transform pattern 32, which occurs at the focal length F of the lens 30 (i.e., in the focal plane, as shown in FIG. 1, and which is unique to the image 12', even though it is not recognizable as the image 12' to the human eye. The light energy in the Fourier domain, i.e., in the focal plane, can be characterized by intensities, i.e., amplitudes of light energy distributed at various spatial positions across the Fourier transform pattern 32. The complex amplitude distribution of light energy 34 in the pattern 32 is the Fourier transform of the complex light distribution in the image 12', which is an optical recreation of the image 12 in monochromatic, preferably coherent, light energy, as will be described in more detail below. Concentrations of intense light energy in the Fourier transform (FT) pattern 32 generally correspond to spatial frequencies of the image 12', i.e., how closely together or far apart features in the image 12' change or remain the same. For example, a shirt with a plaid fabric in an image (not shown), i.e., having many small squares in the spatial domain image, would have a higher spatial frequency, i.e., changes per unit of distance, than a plain, single-color shirt (not shown) in the spatial domain image. Also, portions of an image, such as the bumper and grill parts 35 of the automobile in the spatial domain image 12' would have a higher spatial frequency than the side panel 36 portion of the automobile image 12', because the bumper and grill parts 35 comprise many small pieces with various edges, curves, and other intricate changes within a small spatial distance, whereas the side panel 36 is fairly smooth and uniform over a large spatial distance. Light energy from the finer details of an image in the spatial domain, such as the more intricate bumper and grill parts 35 of the spatial domain image 12', tend to be dispersed farther radially outward from the optical center or axis 40 of the Fourier transformed image, i.e., in the Fourier domain, than light energy from courser or plainer details of an image, such as the side panel 36 of the spatial domain image 12'. The amplitude of light energy 34 dispersed radially outward in the Fourier transform pattern 32 (Fourier domain) is related to the light energy of the corresponding portions of the spatial domain image 12' from which such light energy emanates, except that such light energy is concentrated into areas or bands 34 at the plane of the Fourier transform (FT) pattern 32 after they are refracted by the FT lens 30, i.e., into bands of intense light energy separated by bands of little or no light energy. If the high spatial frequency portions of the image 12', such as the bumper and grill portion 35, are bright, then the intensity or amplitude of light energy from those high spatial frequency portions of the image 12', which are dispersed by the FT lens 30 to the more radially outward bands of light energy 34 in the Fourier transform pattern 32, will be higher, i.e., brighter. On the other hand, if the high spatial frequency portions of the image 12' are dim, then the intensity or amplitude of light energy from those high spatial frequency portions of the image 12', which are dispersed by the FT lens 30 to the more radially outward bands of light energy 34 in the Fourier transform pattern 32, will be lower, i.e., not so bright. Likewise, if the low spatial frequency portions of the image 12', such as the side panel portion 36, are bright, then the intensity or amplitude of light energy from those low spatial frequency portions of the image 12' which are dispersed by the FT lens to the less radially outward bands of light energy 34 in the Fourier transform pattern 32 (i.e., closer to the optical axis 40), will be higher, i.e., brighter. However, if the low spatial frequency portions of the image 12' are dim, then the intensity or amplitude of light energy from those low spatial frequency portions of the image 12', which are dispersed by the FT lens 30 to the less radially outward bands of light energy 34 in the Fourier transform pattern 32, will be lower, i.e., not so bright.

In summary, the Fourier transform pattern 32 of the light emanating from the image 12' (i) is unique to the image 12', (ii) comprises areas or bands of light energy 34 concentration dispersed radially from the center or optical axis 40 that represent spatial frequencies, i.e., fineness of details, in the image 12', (iii) the intensity or amplitudes of light energy 34 at each spatial frequency area or band in the Fourier transform pattern 32 corresponds to brightness or intensity of light energy emanating from the respective fine or course features of the image 12', and (iv) such light energy 34 in the areas or bands of the Fourier transform pattern 32 are detectable in intensity and in spatial location.

However, since this optical image characterizer 10 of this invention is designed to characterize an image 12 by shapes that comprise the image 12, additional spatial filtering of the Fourier transform light energy pattern 32 is used to detect and capture light energy emanating from the finer details or parts of such finer details in the image 12', which are aligned linearly in various specific angular orientations. Such spatial filtering can be accomplished in any of a number of different ways, as will be explained in more detail below, but an exemplary spatial filter 50 arrangement for this function is an elongated slit 52 in an opaque rotor 54 positioned in the focal plane of the FT lens 30 (i.e., in the Fourier domain), which is rotatable on an axle about the optic axis 40. A rotation drive, depicted diagrammatically in FIG. 1 as a motor 56 with a drive belt 58 extending around the spatial filter rotor 54, rotates the spatial filter rotor 54, thus the slit 52, about the optic axis 40, as indicated by arrow 59. In practice, such a motor 56 and belt 58 drive may be used, but other, more efficient rotor apparatus, such as an air drive and air bearings (not shown) can also be used.

Only the portions of the light energy 34 in the Fourier pattern 32 that align with the slit 52 can pass through the spatial filter 50. Such portions of light energy 54, which pass through the spatial filter 50, represent, i.e., emanated largely from details or features of the image 12', such as straight lines and short segments of curved lines, that align lineally with the angular orientation of the slit 52, as will be described in more detail below. Upon propagation of the light energy 54, which passes through the spatial filter 50 in the Fourier domain (i.e., at the focal plane) back into the spatial domain (e.g., at a focal length F from the focal plane), as shown in FIG. 1, the result is a filtered pattern 60 of light energy bands 62 that represent the unique combination of features or lines in the image 12' that align linearly with the silt 52 in the spatial filter 50.

Of course, as the slit 52 rotates about the optical axis 52, as indicated by arrow 59, the slit 52 will align linearly with features or lines in the image 12' that have different angular orientations. Thus, the diffracted light energy bands 62 in the filtered pattern 60 will change along with the rotation of the slit 52 to represent different features, details, or lines in image 12' at various angular orientations, intricateness or fineness, and brightness, as will be explained in more detail below.

The spatially filtered light energy in bands 62 of the filtered pattern 60 can be detected by one or more photodetector(s) 80a, 80b at any of the various angular orientations of the slit 52 and fed electronically to a computer 100 or other microprocessor for processing and encoding, as will be described in more detail below. One significant, but not essential, feature of this invention includes the use of two detector arrays 82a, 82b of individual photosensitive energy transducers 84a, 84b, respectively, but one of said arrays 82a, 82b being virtually offset from the other with respect to the optical axis 40. This feature facilitates detection and recording of the filtered patterns 60 in detail, but quicker and with less data processing capacity or power than would be required with one photodetector array, as will be explained in more detail below. The spatially filtered light beam 61 is split by beam splitter 64 to send the beam 61 to both photodetectors 80a, 80b, so that the filtered patterns 60 are detected by both detector arrays 82a, 82b.

The computer 100, with input of optical information about the filtered patterns 60, i.e., light energy intensity (I) distribution, from the one or two detector array(s) 82a, 82b, along with information from the image handling apparatus 20 about the image 12 (e.g., identification number, source locator, and the like), and information from the spatial filter 50 about the angular orientation (R) of the slit 52, can be programmed to encode the characteristics of the image 12 relating to the shape content of the image 12. One useful format for encoding such information is by pixel of the filtered image 60, including information regarding x, y coordinate location of each pixel, Rotation (i.e., angular orientation of the slit 52, thus of the linear features of the image 12 that align with such angular orientation), and Intensity (i.e., amplitude of light energy from the filtered pattern 60 that is detected at each pixel at the angular orientation R. A searchable flag, such as a distortion factor X, can also be provided, as will be explained in more detail below. Such combination of angular orientation or rotation R, light energy intensity I for each pixel, and distortion factor X can be called a "PIXel" for short. Each RIXel can then be associated with some identifier for the image 12 from which it was derived (e.g., a number, name, or the like), the source location of the image 12 (e.g., Internet URL, data base file, book title, owner of the image 12, and the like), and any other desired information about the image, such as format, resolution, color, texture, or the like. Some of such other information, such as color and/or texture can be information input from another data base or even from another optical characterizer that automatically characterizes the same image 12 as to color, texture, or the like—whatever would be useful for searching and finding image 12 or for comparing image 12 to other images.

Some, all, or additional combinations of such information about each image 12, 14 . . . , n characterized for shape and encoded, as described above, can be sent by the computer 100 to one or more data base(s) 102. Several example data base architectures 104, 106, 108 for storing RIXel information about each image 12, 14, . . . , n are shown in FIG. 1, but many other architectures and combinations of information could also be used.

In the optical image characterizer 10 illustrated in FIG. 1, the image 12 is recreated with monochromatic, preferably coherent, light energy, e.g., at image 12'. Such recreation of the image 12 in the form of monochromatic optical image 12' can be accomplished with a spatial light modulator (SLM) 26 illuminated with a beam of coherent light 24 from a laser source 23, such as a laser diode or gas diode. This feature of the invention could also be implemented with white light, although the resultant Fourier transform and spatially filtered patterns would be more blurred than with monochromatic light. Therefore, while this description of the invention will proceed based on monochromatic, preferably coherent, light, it should be understood that white light is a suitable, albeit not preferred, substitute. The spatial light modulator (SLM) 26 can be optically addressable, such as the one illustrated in FIG. 1, or it can be electrically addressable and driven, for example by a video camera (not shown) or by a computer (not shown). As is known by persons skilled in the art, a spatial light modulator can "write" an image into a polarized beam of light 25 by rotating the polarization plane of the light on a spatial basis across the beam 25 to either absorb or transmit the polarized light, or partially absorb or transmit the polarized light, depending on what is needed to create the image 12' in monochromatic light. In an optically addressed SLM 26, the image plane is addressed on a spatial basis by incident light energy on a semiconductor material adjacent the polarization rotating material (usually a liquid crystal material), whereas, in an electrically addressable SLM (not shown), the liquid crystal, polarization rotating material is addressed electrically on a pixel by pixel basis. In either case, portions of the polarized beam of coherent light 25 are either absorbed or transmitted by the liquid crystal material in the SLM 26. In some SLM's, such as the optically addressed SLM 26 shown in FIG. 1, the transmitted portions of the polarized light have the plane of polarization rotated 45 degrees as it passes once through the liquid crystal material, whereupon it is reflected and passed back through the liquid crystal again to be rotated another 45 degrees. Thus, the light in polarized beam 25 that is not absorbed in the SLM 26 is reflected and emerges from the SLM along the same optical path 27, but in the form of image 12' and with its plane of polarization rotated 90 degrees. Some electrically addressed SLM's work much the same way, i.e., transmitting the polarized light twice through the liquid crystal with a reflection between the two passes, while others simply transmit the polarized light through the liquid crystal once in one direction.

In the FIG. 1 embodiment, the coherent light beam 24 from laser source 23 is passed first through a polarizer 28 to create a polarized beam of light 25 with all the light polarized in one plane, such as, for example, but not for limitation, in the s plane, as indicated by 25(s). The s-polarized beam 25(s) is then passed through a spatial filter 110 comprised essentially of a pin hole 112 and a lens 114 to focus the beam 25(s) on the pin hole 112. This spatial filter 110 is provided primarily to condition the beam 25(s) to get a good Gaussian wavefront and, if necessary, to limit the power of the beam 25(s). Lens 114a then columnates the light.

The beam 25(s) is then passed through a polarizing beam splitter 116, which reflects light polarized in one direction at plane 118 and transmits light polarized in the orthogonal direction. In this example, the polarizing beam splitter 116 reflects s-polarized light and transmits p-polarized light, and it is oriented to reflect the s-polarized beam 25(s) toward the optically addressed spatial light modulator (SLM) 16.

At the same time, the light beam 22 from illuminator 21, such as a laser diode or gas laser, illuminates the image 12. As mentioned above, there are many other ways to put the image 12 into the optical image characterizer 12, such as with a cathode ray tube, SLM video display, mechanical slide projector, movie projector, and many more, as will be apparent to persons skilled in the art. For simplicity, the image 12 is illustrated in FIG. 1 on transparency or film 120, placed in a support 122 in the path of beam 22. A light diffuser plate 124, such as a frosted or etched glass, can be positioned in front of the film 120 to obtain a uniform illumination of the image 12. The beam 22 carrying image 12 is then projected (focused) onto the optically addressable spatial light modulator (SLM) 26 by a lens 126. The spectral mirror 128 is optional. It is used here to fold the beam 22 in order to keep the optics in a more compact arrangement.

With the image 12 focused onto the SLM 26, the SLM 26 imparts or "writes" the image 12 into the monochromatic light beam 25(s), which emerges from the SLM 26, as described above, with its plane of polarization rotated 90 degrees. Therefore, the emerging beam 27(p) of coherent light, carrying image 12', is p-polarized instead of s-polarized. Consequently, the is monochromatic light beam 27(p) with the image 12' is transmitted by the polarizing beam splitter 116 to the FT lens 30, instead of being reflected by it.

The positive FT lens (30), as explained above, redistributes the monochromatic light energy in the image 12' into its Fourier transform pattern 32, which occurs at the focal plane of the FT lens 30. Therefore, the spatial filter 50 with the rotating slit 52 has to be positioned in the focal plane of the FT lens 30, as indicated by the focal distance F in FIG. 1. As also explained above, the complex amplitude distribution of light energy 34 in the Fourier transform pattern 32 at the focal plane of the FT lens 3.0 is the Fourier transform of the complex amplitude distribution in the image 12'. The Fourier transform pattern 32 has all of the light energy from the image 12' distributed into the symmetrical pattern 32 based on the spatial frequencies of the image 12', with intensities of the light energy in the various spatial frequency distributions 34 based on the light energy in the corresponding portions of the image 12' where those respective spatial frequencies occur. The Fourier transform pattern 32, as mentioned above, is symmetrical from top to bottom and from left to right, so that each semicircle of the Fourier pattern 32 contains exactly the same distribution and intensity of light energy. Light energy from lower spatial frequencies in the image 12' are distributed toward the center or optical axis 40 of the Fourier transform pattern 32, while the light energy from higher spatial frequencies in the image 12' are distributed farther away from the optical axis 40 toward the outer edge of the pattern 32. Light energy from features in the image 12' that are distributed vertically in the image 12' to create those various spatial frequencies is likewise distributed vertically in the Fourier transform pattern 32. At the same time, light energy from features in the image 12' that are distributed horizontally in the image 12' to create those various spatial frequencies is distributed horizontally in the Fourier transform pattern 32. Therefore, in general, light energy from features in the image 12' that are distributed in any angular orientation with respect to the optical axis 40 to create the various spatial frequencies in the image 12', i.e., in the spatial domain, is also distributed at those same angular orientations in the Fourier transform pattern 32, i.e., in the Fourier domain. Consequently, by detecting only light energy distributed at particular angular orientations with respect to the optical axis 40 in the Fourier transform pattern 32, such detections are characteristic of features or details in the image 12' that are aligned linearly in such particular angular orientations. The radial distributions of such detected light energy in the Fourier domain at each such angular orientation indicate the intricateness or sharpness of such linear features or details in the spatial domain image 12', while the intensities of such detected light energy in the Fourier domain indicate the brightness of such features or details in the spatial domain image 12'.

Therefore, a composite of light energy detections at all angular orientations of the slit 52 in the Fourier transform pattern 32 creates a composite record of the shapes, i.e., angular orientations and intricateness or sharpness of linear features, that comprise the image 12'. However, for most practical needs, such as for encoding shape characteristics of images 12, 14, . . . , n for data base storing, searching, and retrieval, it is not necessary to record such light energy detections for all angular orientations of the slit 52 in the Fourier transform pattern 12'. It is usually sufficient to detect and record such light energy distributions and intensities for just some of the angular orientations in the Fourier transform pattern 32 to get enough shape characterization for data base storage, searching, and retrieval of specific images 12, 14, . . . , n, For purposes of explanation, but not for limitation, use of 11.25-degree angular increments are used, because there are sixteen (16) 11.25-degree increments in 180 degrees of rotation, which has data processing and data storage efficiencies, as will be explained below. However, other discrete angular increments could also be used, including constant increments or varying increments. Of course, varying increments would require more computer capacity and more complex software to handle the data processing, storing, and searching functions.

In the preferred embodiment of this invention, the spatial filter 50 with its slit 52 is used to allow only light energy from specific angular orientations in the Fourier transform pattern 32 to pass at any instant in time to the detector arrays 82a, 82b, which are positioned a focal length F from the spatial filter 50 to allow projection of the light energy 61 that passes through the slit 52 in the Fourier domain back into the spatial domain for detection of the portion of the shape content of the optic image 12 comprised in such light energy 61 by the one or both detector(s) 80a, 80b. The rotor 54 with the slit 52 is rotated, as indicated by arrow 59, so that the detector arrays 82a, 82b can detect light energy distribution and intensity (I) emanating from the Fourier transform pattern 32 at any angular orientation (R) of the slit 52. This function could also be provided in a number of other ways for purposes of this invention. For example, an electrically addressable spatial light modulator (not shown) could be used for the spatial filter 50 by turning pixels in the spatial light modulator on and off in a sequence that would effectively create a spatial filter with a slit at selected angles of orientation, as would be understood by persons skilled in the art.

The preferred, but not essential, shape of the slit 52 in the spatial filter 50 is a narrow, elongated rectangle, possibly with the center 53 blocked, as described below. The width of the slit 52 will depend on the light energy available or needed. A wider slit 52 will let more light energy 34 pass through, but precision of line or feature resolution of the image will degrade. A narrower slit 52 will get better line resolution, but with a corresponding increase in the complexity of the resulting pattern shape generalization and complexity. Therefore, a balance has to be struck between these resolution and detectability considerations in choosing slit 52 size. Also, slits of different shapes, such as ovals, or other shapes could be used to capture shapes other than lines from the image 12.

As the slit 52 rotates, the computer 100, or some other appropriate microprocessor circuit, can record the light energy distributions and intensities detected by the detector arrays 82a, 82b whenever the slit 52 is at selected increments of angular orientation R. For example, 11.25-degree increments of 11.25°, 22.5°, . . . , 180° would be effective to detect all 11.25-degree increments of angular orientation through a full 360° circle. While not necessary, it may be desirable to block the center of slit 52 near the optical axis 40, since light energy in the Fourier transform pattern 32 near the center 40 will usually be the most intense, but will not represent linear features or details in the image 12' that characterize shapes comprised in image 12'. Therefore, to facilitate use of sensitivity levels in the detector arrays 82a, 82b that are necessary to detect accurately and precisely the less intense light energy in the farther radially outwardly dispersed regions of the Fourier transform pattern 32, which do indicate shape content of the image 12', it may be beneficial to mask or filter out the more intense light energy near the center 40 of the Fourier transform pattern 32.

The rotating spatial filtering process described above is illustrated in more detail in FIGS. 2a–c, 3a–c, and 4a–c. For example, when the rotor 54 of spatial filter 50 is rotated, as indicated by arrow 59, so that the slit 52 has a vertical angular orientation, which is indicated in FIG. 2a to be 0°, the slit 52 allows only the portion of the light energy 54 in the Fourier transform pattern 32 (FIG. 1—hidden from view in FIG. 2a by the rotor 54) that aligns with the slit 52 to pass to the detector arrays 82a, 82b (FIG. 1). That light energy 34, which is dispersed vertically in the Fourier transform pattern 32 (FIG. 1), emanated originally from, and corresponds to, all of the substantially vertically oriented features or details in the image 12', such as the substantially vertical lines 66, 66' in FIG. 2b. As explained above, the light energy 34 from the more intricate or closely spaced vertical parts or lines 66 (i.e., higher spatial frequency), such as those in the front bumper and grill portion 35 of image 12', are dispersed farther radially outward from the optical center or axis 40, while the light energy 34 from the less intricate or farther spaced apart vertical parts or lines (i.e., lower spatial frequency), such as the substantially vertical parts or lines 66' in the trunk and rear bumper portions of the image 12' in FIG. 2b, are dispersed not so far from the optical center or axis 40. The intensity of the light energy 34 in those respective dispersion bands, as explained above, depends on the brightness of the corresponding respective vertical features 66, 66' in the image 12'. Again, the central portion 53 of the rotor 54 can be blocked, if desired, because the light energy 54 in and near the center 40 of the Fourier transform 32 (FIG. 1) emanates from features in image 12' with very low spatial frequencies, such as the overall brightness of the image, which do very little, if anything, to define shapes.

As also explained briefly above, the light energy 34 that passes through the slit 52, and which characterizes the vertically oriented features, parts, or lines 66, 66' of the image 12', when the slit 52 is oriented vertically, as shown in FIG. 2a, is diffracted by the slit 52 and projected via beam splitter 64 to the two detector arrays 82a, 82b, which are spaced the focal distance F of FT lens 30 from the spatial filter 50 in order to detect the light energy passed by the spatial filter 50 after it propagates back into the spatial domain. The diffraction of the light energy 34 by slit 52 redistributes the light energy 34 that passes through slit 52 into substantially vertically oriented bands 62 in the diffraction pattern 60, as illustrated in FIG. 2c, at the detector arrays 82a, 82b (FIG. 1). While the light energy is redistributed in the bands 62, as shown in FIG. 2c, it is still uniquely representative of the shape content passed by the spatial filter 50 that is comprised in the image 12'. Therefore, the light energy bands 62 in FIG. 2c are detected by detector arrays 82a, 82b for recording the vertically oriented shape characteristics of the image 12', as will be described in more detail below.

As mentioned above, the slit 52 of spatial filter 50 rotates, as indicated by arrow 59. The angular position of the slit 52 shown in FIG. 3a is approximately 45 degrees from vertical. At this rotational 45-degree angular orientation R, the light energy 34 that passes through the slit 52 corresponds to all of the features, parts, or lines 67 in image 12' that are oriented at about 45 degrees from vertical, as illustrated in FIG. 3b. Portions of curved features, parts, or lines 67' in the image 12' that are oriented at about 45 degrees from vertical also contribute to the light energy 34 that passes through the slit 52, when it is rotated to about 45 degrees from vertical, as shown in FIG. 3a. The bands 62 of light energy in the filtered pattern 60, shown in FIG. 3c, resulting from the 45-degree angular orientation of slit 52 in FIG. 3a, are also oriented at about to 45 degrees from vertical and are indicative of the shape characteristics 67, 67' of image 12' that are oriented at about 45 degrees from vertical. Thus, detection of the light energy bands 62 in FIG. 3c by detector arrays 82a, 82b facilitates encoding and recording of the 45-degree oriented shape characteristics of the image 12', as will be described below.

Figure 4C:
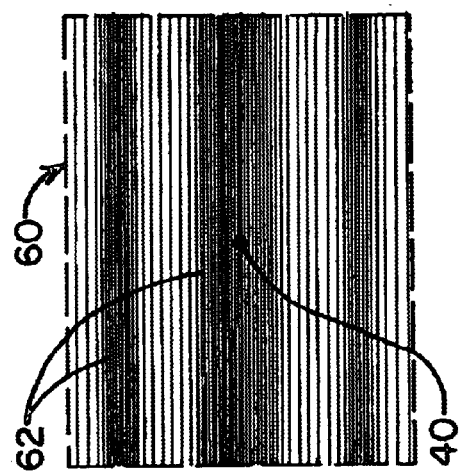
FIGS. 4a–c are also similar to FIGS. 2a–c, but with the slit rotated to horizontal.
Figure 4B:
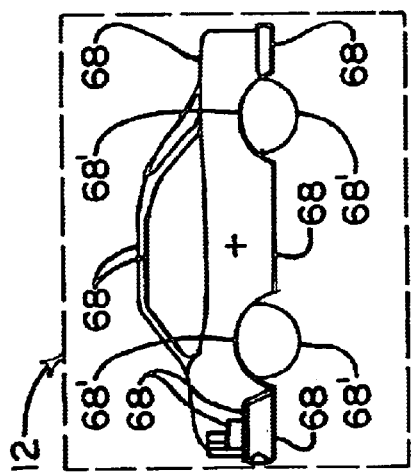
Figure 4A:
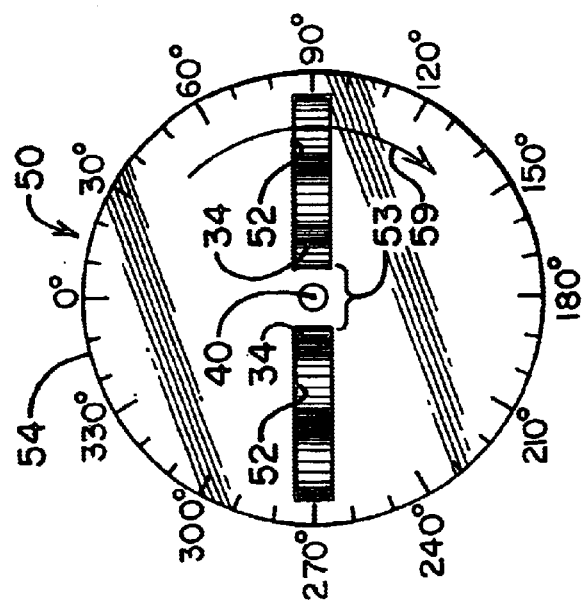

In a similar manner, when the slit 52 is rotated to a 90-degree orientation from vertical, i.e., horizontal, as shown in FIG. 4a, the light energy 34 that passes through slit 52 is characteristic of all of the substantially horizontal features, parts, and lines 68 of the image 12', as shown in FIG. 4b. Portions of curved features, parts, or lines 68' in the image 12' that are substantially horizontal also contribute to the light energy 34 that passes through the horizontal slit 52 in FIG. 4a. The bands 62 of light energy in the filtered pattern 60, shown in FIG. 4c, resulting from the horizontal orientation of slit 52 in FIG. 4a, are also oriented substantially horizontal and are indicative of the shape characteristics 68, 68' of image 12' that are oriented substantially horizontal. Thus, detection of the light energy bands 62 in FIG. 4c by detector arrays 82a, 82b facilitates encoding and recording of the horizontal shape characteristics of the image 12', as will be described below.

It should be clear by now that any particular angular orientation R of slit 52 will allow detection of all the shape characteristic of image 12' that have substantially that same angular orientation R. Thus, all of the shape characteristics of the image 12' can be detected by detecting the bands 62 of the filtered pattern 60 with the slit 52 at all angular orientations. However, as mentioned above, it is sufficient for most purposes to detect some, preferably most, but not necessarily all, of the shape characteristics of the image 12' by choosing to detect the light energy bands 62 of filtered pattern 60 at certain selected increments of rotation R, i.e., angular orientation of slit 52. Obviously, the bigger the increments of angular orientation of slit 52 where light energy bands 62 are detected, the less precise the detected shape characteristics of the image 12' will be. On the other hand, the smaller the increments of angular orientation, the more data that will have to be processed. Therefore, when selecting the angular increments of slit 52 at which light energy bands 60 will be detected and recorded, it may be desirable to strike some balance between preciseness of shape characteristics needed or wanted and the speed and efficiency of data processing and storage required to handle such preciseness. For example, but not for limitation, it is believed that detection and recording of the shape characteristics at increments of rotation of slot 52 in a range of about 5 to 20 degrees, preferably about 11.25-degrees, will be adequate for most purposes.

Of course, it is only necessary to detect and record the light energy bands 62 in the selected angular increments through 180 degrees, i.e., one-half of a revolution, of the slit 52, because, as shown in FIGS. 2a, 3a, and 4a, the slit 52 extends radially outward in opposite directions from the optical axis 40. Therefore, as one end of the slit 52 rotates from 0 degrees to 180 degrees, the opposite end of the list 52 rotates from 180 degrees to 360 degrees. Therefore, by detecting light energy bands 62 at selected increments of rotation through 180 degrees, all the shape characteristics of the image 12' at the selected angular orientations defined by the selected increments of rotation are detected.

In a preferred embodiment of the invention, the rotor 54 with its slot 52 can be rotated continuously. During the first half of each revolution, i.e., through 180 degrees, the light energy bands 62 are detected and recorded at each selected increment or angular orientation, such as at every 11.25-degree increment of rotation. Then, during the second half of each revolution, the image handling apparatus 20 switches the next image 14 into the optical image characterizer 10, as indicated by arrow 16 in FIG. 1. Then, the shape characterizing and detecting process described above is performed on the image 14 as the slit 52 rotates one-half of a revolution. During the next one-half revolution, the next image is switched into the optical image characterizer 10, and the process can cycle in this manner indefinitely, as long as there are additional images n available for characterizing, encoding, and recording.

As mentioned above, the detection of the light energy bands 62 in the filtered images 60 for each angular orientation of slit 52 can be accomplished with any photodetector that has the capability of detecting and outputting electric signals that are indicative of intensity of light energy on a spatial basis, such as on a pixel by pixel basis. For example, a video camera or an electronic still camera with a CCD (charge coupled device) array could be used, as would be well within the capabilities of persons skilled in the art.

However, another feature of this invention is the use of two photodetectors 80a, 80b, as shown in FIG. 1, each of which has a small array 82a, 82b of photosensitive elements or transducers 84a, 84b, respectively; which form pixels The two photodetectors 80a, 80b can, for convenience, sometimes be called, collectively, a photodetector. One of the photodetector arrays 82b is virtually offset in relation to the other photodetector array 82a with reference to the optical axis 40 by one-half pixel vertically and by one-half pixel horizontally. This arrangement of two small photodetector arrays 82a, 82b, in combination with appropriate software, facilitates precise intensity and spatial location light energy detection with minimal data handling requirements.

Referring now primarily to FIG. 1, the preferred embodiment of this invention uses two detector arrays 82a, 82b to detect the light energy 62 in the filtered pattern 60, although one photodetector with an array of photodetector elements could also be used. The two detector arrays 82a, 82b are depicted in FIG. 1 as parts of two separate photodetectors 80a, 80b, although the entire assembly of photodetectors 80a, 80b with their arrays 82a, 82b could be one photodetector apparatus and is sometimes referred to collectively in this description specification as a photodetector in a generic sense to cover both singular and plural photodetector apparatus. The advantage of two detector arrays 82a, 82b is that, by virtual offsetting the photosensor elements 84a, 84b of the arrays 82a, 82b in relation to each other with respect to the optical axis 40 or filtered pattern 60, and with a fairly simple comparator circuit or a simple software algorithm, the intensity of light energy 62 at various locations in the filtered pattern 60 can be detected accurately and precisely enough for purposes of image shape characterization according to this invention, but with less data than would be required for a conventional single photodetector array.

As explained above, the diffracted beam 61 carrying the filtered pattern 60 is split by a beam splitter 64, such as a half-silvered mirror, so that preferable, but not essentially, about half the light energy in diffracted beam 61 is transmitted as beam segment 61a to the first detector array 82a, while the other half of the light energy in filtered beam 61 is reflected as beam segment 61b to the second detector array 82b. Both beam segments 61a, 61b carry the filtered pattern 60, which has the light energy 62 filtered into bands that are unique to the image 12', as explained above. If the light energy in beam 61 is not split half and half in beam segments 61a, 61b, the intensity outputs of the photosensitive elements 84a, 84b of one or the other of the arrays 82a, 82b would have to be adjusted up or down electronically or in software in order to make the intensity comparisons and selection for data storage, which comparisons and selection are described below in more detail. Both of the detector arrays 82a, 82b are positioned the same optical distance F from the spatial filter 50, so virtually identical light energy 62 distributions in the spatial domain are incident on both of the detector arrays 82a, 82b. However, one of the photodetectors 80a, 80b is offset from the optical axis 40 in virtual relation to the other. For example, as shown in FIG. 1, the center line 86a of photodetector 80a is aligned with the optical axis 40 of beam segment 61a, while the center line 86b of photodetector 80b is offset from the optical axis 40 of beam segment 61b, as indicated by arrows 88, 89. Specifically, as illustrated by the diagrammatic projection of the detector arrays 82a, 82b into virtual juxtaposed relation to each other (first detector array 82a virtually "overlaying" second photodetector array 82b in the plane of the paper in FIG. 1), the second detector array 82b is offset vertically by a distance equal to one-half the width of photosensitive element 84a, 84b, as indicated by arrow 88, and it is further offset horizontally by a distance equal to one-half the height of a photosensitive element 84a, 84b, as indicated by arrow 89. An individual photosensitive element 84a of array 82a is therefore in virtual, partial juxtaposition to four (4) adjacent photosensitive elements 84b of detector array 82b.

Figure 5:
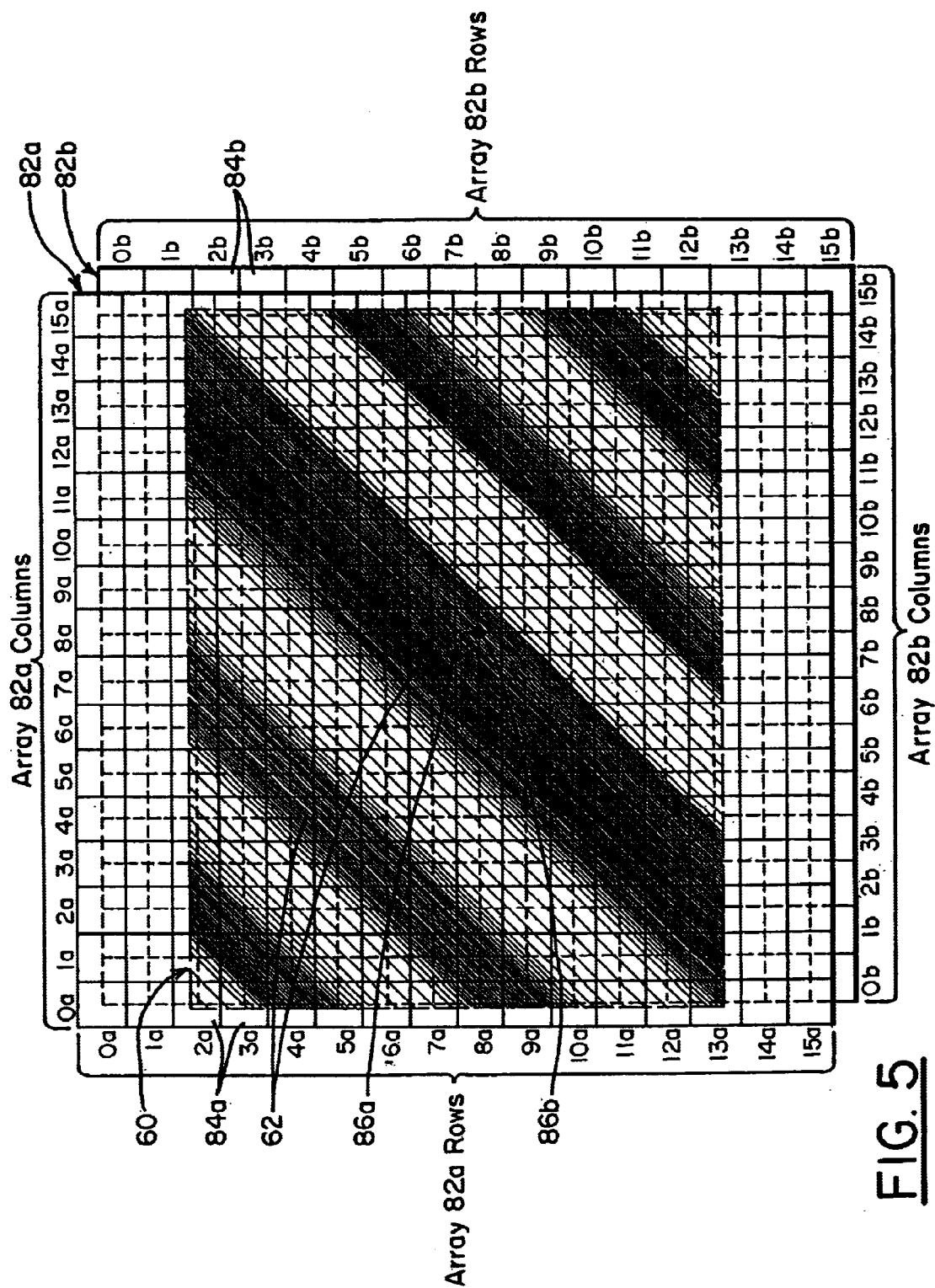
FIG. 5 is a diagrammatic illustration of the offset, virtual juxtaposed detector grids of this invention as used to detect a filtered pattern of light energy.

Therefore, as illustrated by the enlarged diagrammatic, virtual juxtaposition of the detector arrays 82a, 82b in FIG. 5 together with a filtered pattern 60, the same light energy 62 is not incident on corresponding individual photosensitive elements 84a, 84b of the respective detector arrays 82a, 82b. For example, when the filtered pattern 60 from FIG. 3c (i.e., with the slit 52 in FIG. 3a rotated to 45 degrees) is incident on the detector arrays 82a, 82b, as illustrated in FIG. 5, the light energy 62 incident on the photosensitive element 84a in column 7a, row 6a, of detector array 82a will not be the same as the light energy 62 incident on the corresponding photosensitive element 84b in column 7b, row 6b, of detector array 82b. In fact, as shown by the example in FIG. 5, the light energy 62 incident on the photosensitive element 84a in column 7a, row 6a, of detector array 82a will be less than the light energy 62 incident on the photosensitive element 84b in column 7b, row 6b, of detector array 82b. Of course, the situation of each photosensitive element 84a, 84b with respect to incident light energy will change for different filtered patterns 60 from different angular orientations of the slit 52 for the same image 12' and will also change for different filtered patterns 60 from different original images 12, 14, . . . , n (FIG. 1) characterized by the optical image characterizer 10. However, the different incident light energy intensities on partially juxtaposed photosensitive elements 84a, 84b of the respective virtual offset detector arrays 82a, 82b are used according to this invention to encode and store shape characteristic data of images 12, 14, . . . , n efficiently and with sufficient of the data, as will be described in more detail below.

For purposes of explanation, and not for limitation, the description that follows will use detector arrays 82a, 83b comprised of 16 columns and 16 rows of photosensitive elements 84a, 84b, respectively for efficient use of bytes and data base storage. The photosensitive elements 84a, 84b can be photo diodes, photo cells, or any other photosensitive device that produces an electric signal, such as a voltage, which is indicative of intensity of light energy incident on the photosensitive element. The voltage or other signal output of each photosensitive element 84a, 84b in each array is readable individually, as is well-known to persons skilled in the art, and electric signal processing circuits for reading, processing, and recording such signals from arrays of photosensitive elements are well-known to persons skilled in the art. Therefore, no further explanation of photosensitive elements or electric circuits for reading, processing, and recording information from arrays of photosensitive elements is needed to describe or to understand this invention.

Also, for purposes of explanation, but not for limitation, the intensities of light energy 62 incident on the photosensitive devices can, but does not have to, be recorded at 11.25-degree angular increments of rotation of the slit 52 of spatial filter 50, through 180 degrees of rotation, as described above. The use of 11.25-degree angular increments is sufficient to collect enough shape-related data for each image 12, 14, . . . , n to provide fast, meaningful, and efficient characterization, storage, search, and retrieval of images, and 11.25 degrees divides 180 degrees by 16, thus making efficient use of bits and data storage bytes of information. However, other angular increments for more or less preciseness in shape characterization, and other sizes of photosensitive arrays for more or less preciseness in shape characterization, can certainly be used in this invention.

The virtually offset detector arrays 82a, 82b improve precision of light energy detection on an element-by-element basis with the relatively few, large photosensitive elements 84a in detector array 82a, e.g., only 256 photosensitive elements 84a in a 16×16 detector array 82a. According to the preferred implementation of this invention, only light energy intensities for 256 locations, i.e., for a 16×16 array, have the potential to be recorded for each angular orientation of the slit 52. Since the number of photosensitive elements 84a in the 16×16 detector array 82a is relatively small, the surface area segment of the filtered pattern 60 from which each photosensitive element 84a detects light energy 62 is relatively large. The obvious advantage of fewer photosensitive elements 84a, each one detecting light energy from relatively larger area segments of the filtered pattern 60, as compared to conventional photodetecting with detector arrays of many photosensitive elements, such as 256×256 CCD arrays, is that much less data is generated, thus much less data has to be processed.

A disadvantage for this application, i.e., characterizing images by shape content, is the probability that some small area, but high intensity light spots or energy distributions in the filtered pattern 60 may be incident on small portions or surface areas of more than one photosensitive element 84a, thus would have the intense light energy spread over several photosensitive elements 84a instead of one. Such high intensity spots or zones are important to detect, but when the light energy is spread over several photosensitive elements 84a, thereby splitting the intense light energy among two or more photosensitive elements 84a, the intensity signal outputs will be lower than if all of the light energy was incident on one photosensitive element. Such resulting lower intensity signal outputs from the several photosensitive elements 84a and the consequent failure to capture and record the high intensity light energy, which is really incident on the detector array, would result in loss of significant shape information about the image 12', i.e., bright, sharp details or lines in the image 12'.

Figure 6:
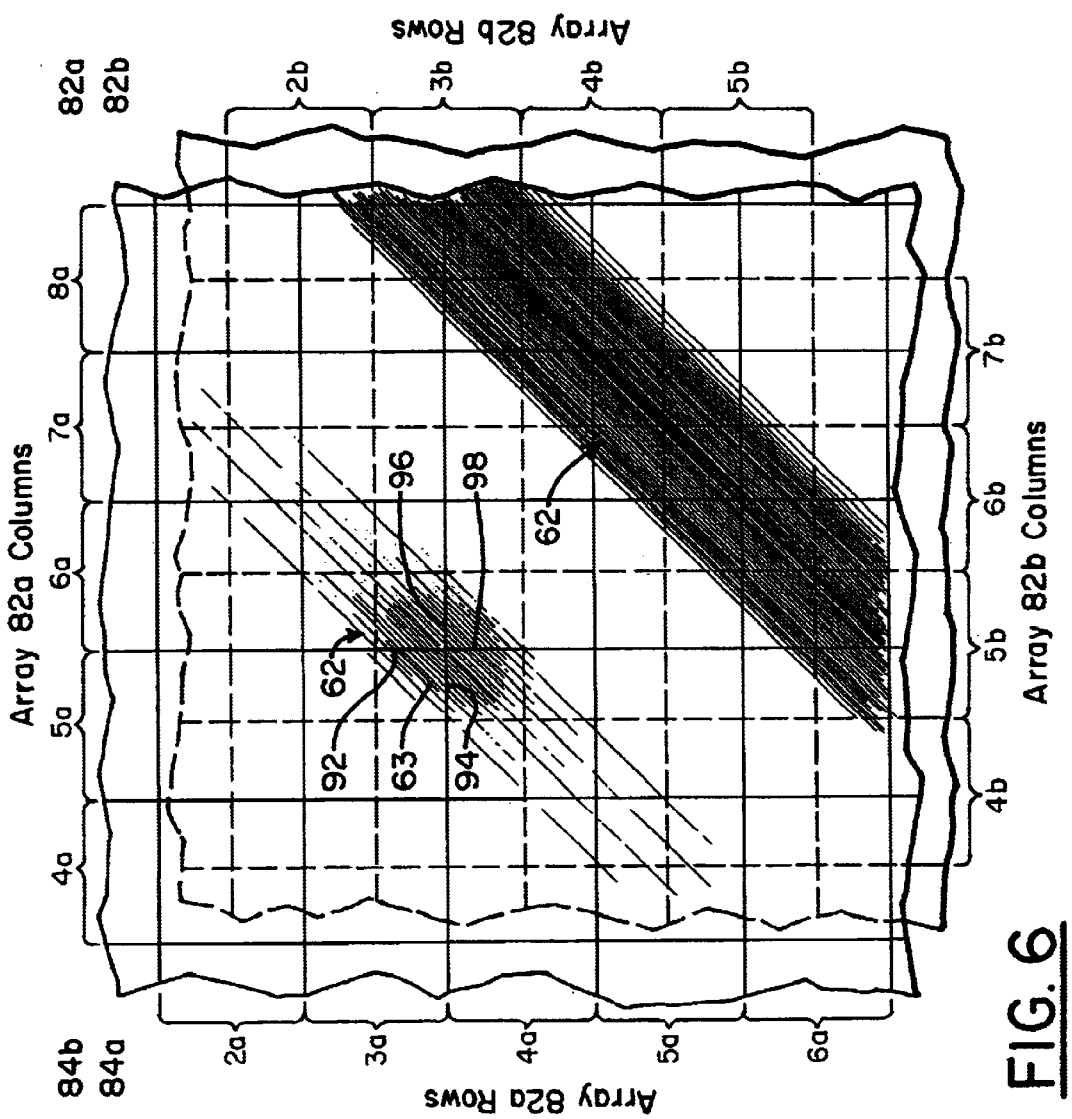
FIG. 6 is an enlarged portion of the virtual juxtaposed detector arrays illustrating detection of light energy spots or areas that straddle boundaries between adjacent photosensitive elements.

To illustrate this problem and a solution according to this invention, reference is made primarily to FIG. 6, which is an enlarged view of several photosensitive elements 84a of the detector array 82a virtually overlaying several offset photosensitive elements 84a of the detector array 82a as described above. Some secondary references in the explanation of FIG. 6 will be to components or features illustrated in FIGS. 1–5 and described previously, so some references to those figures will also be helpful. In FIG. 6, a band 62 of light energy has a concentration or zone 63 of intense light energy that happens to straddle boundaries 92, 94, 96, 98 between four individual photosensitive elements 84a of detector array 82a those four photosensitive elements 84a are in column 5a, row 3a; column 6a, row 3a; column 5a, row 4a; and column 6a, row 4a. Those four photosensitive elements 84a, are denoted for convenience as C5a-R3a, C6a-R3a, C5a-R4a, and C6a-R4a, with C standing for column and R standing for row. Thus, with very little light energy incident on the remaining surface areas of those four photosensitive elements, the electric signals produced by each of those photosensitive elements 84a at C3a-R3a, C6a-R5a, C5a-R4a, and C6a-R4a will indicate much less light energy intensity than is really incident at that spot on zone 63.

However, as was explained above, only one-half of the light energy passed by the spatial filter 50 in beam 61 (FIG. 1) is projected in beam 61a to detector array 82a. The other half of the light energy in beam 61 is projected by beam splitter 64 in beam 61b to detector array 82b. Also, as explained above, the detector array 82b is virtually offset vertically and horizontally by one-half the size of a photosensitive element 84a, 84b, as indicated in FIG. 1 by vertical offset 88 and horizontal offset 89. Therefore, as illustrated by the enlarged, virtual juxtaposition of portions of the respective detector arrays 82a, 82b, respectively, the corresponding spot or zone 63 of intense light energy in beam 61 is incident largely within the single photosensitive element 84b that is in column 5b, row 3b (i.e., C5b-R3b) of the detector array 82b. Therefore, the electric signal output of photosensitive element C5b-R3b of detector array 82b will be much more indicative of the high intensity of the light energy in the soot or zone 63 than the electric signals produced by any of the four photosensitive elements at C5a-R3a, C6a-R3a, C5a-R4a, or C6a-R4a of the detector array 82a. It is important to capture and record such higher intensity light energy in the spot or zone 63 of the filtered pattern 60, because such higher intensity light energy represents a particularly bright feature, detail, or line in the image 12' (FIG. 1) that is aligned with the angular orientation of the slit 52 (FIGS. 2–4) when the light energy in the spot or zone 63 is detected by the detector arrays 82a, 82b.

Figure 7:
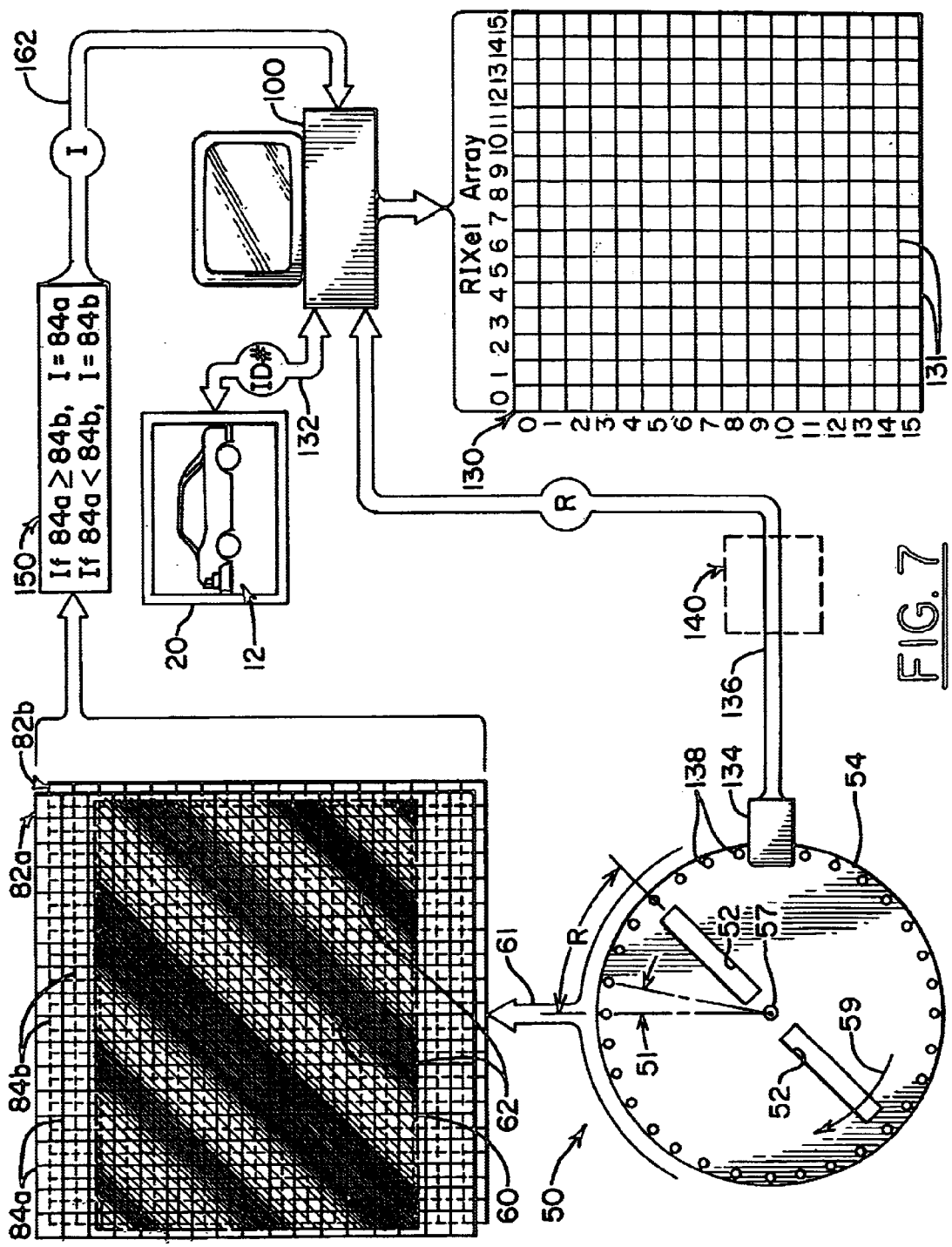
FIG. 7 is a functional diagram illustrating collection of image identity and RIXel rotation and intensity data for the RIXel data array.

According to a preferred implementation of this invention, as best seen in FIG. 7 in conjunction with FIGS. 5 and 6, a data array 130 (dubbed here as a RIXel array) has the same configuration as one of the detector arrays 82a, 82b. For purposes of this explanation, the RIXel array 130 is a 16×16 array to match the 16×16 detector array 82a of photosensitive elements 84a. Thus, there is a RIXel space or position 131 (sometimes called a bin) that corresponds with each photosensitive element 84a in detector array 82a. Thus, for example, an intensity I associated with the photosensitive element 84a at C7a-R5a of detector array 82a will be recorded in the corresponding space or bin 131 at C7-R5 of the RIXel array 130. The previous sentence refers to intensity I "associated with" a particular photosensitive element, instead of "produced by," because the intensity I recorded in a RIXel array space 131 may, but not necessarily, be the intensity produced by the corresponding photosensitive element 84a in detector array 82a. It could be the intensity produced by one of the virtual partially juxtaposed photosensitive elements 84b of detector array 82b, if one or more of those partially juxtaposed photosensitive elements 84b produces a higher intensity than the corresponding photosensitive element 84a in detector array 82a.

At each selected angular orientation of the slit 52, only enough data spaces or bins 131 are provided in RIXel array 130 to receive intensity signals from the same number of photosensitive elements 84a as there are in one array 82a. However, in order to capture the high intensity information that could otherwise get lost, before the value of the electric signal output of each photosensitive element 84a in detector array 82a is recorded permanently, it is compared with signals produced by each of the partially juxtaposed photosensitive elements 84b of detector array 82b. The highest intensity signal found by this comparison is the one that is selected for possible permanent record in RIXel array 130. For example, the high intensity spot or zone 63 illustrated in FIG. 6 will cause the photosensitive element 84b at C5-R3 in detector array 82b to produce a high intensity signal, while each of the four (4) photosensitive elements 84a at C5a-R3a, C6a-R3a, C5a-R4a, and C6a-R4a in detector array 82a will produce lower intensity signals. Therefore, before the signal produced by the photosensitive element 84a located at C5a-R3a is selected for permanent record in the space 131 at C5-R3 in the RIXel array 130, it is compared to the intensity signals produced by each of the four photosensitive elements 84b in array 82b that are partially juxtaposed to element C5a-R3a, i.e., photosensitive elements 84b of array 82b that are located at C4b-R2b, C5b-R2b, C4b-R3b, and C5b-R5b. From FIG. 6, it can be seen that, in this example, the highest intensity output from among those five photosensitive elements (i.e., C5a-R3a, C4b-R3b, C5b-R2b, C4b-R3b, and C5b-R3b) will be the intensity signal considered for permanent recording in the space 131 at C5-R3 in the RIXel data base array 130. It can also be seen in FIG. 6 that the intensity I signal, which will be selected for recording in that space 131 at C5-R3 in the RIXel will be the one produced, not by the corresponding photosensitive element 84a at C5a-R3a of detector array 82a, but the higher intensity signal produced by the photosensitive element 84b at C5b-R3b in detector array 82b. The reason that each selected intensity signal from this kind of comparison, such as the intensity produced by photosensitive element 84b at C5b-R3b in the example above, is just considered for permanent recording, instead of being recorded automatically, is that only intensity signals that meet or exceed a certain intensity threshold are kept for a permanent shape characterization record. Intensities that do not meet the threshold intensity are not indicative of significant shape content in the image 12', thus are not recorded, as will be explained in more detail below. In the example of FIG. 6 described above, the intensity signal from photosensitive element 84b at C5b-R3b would most likely exceed such a threshold and would be recorded as the intensity I in space 131 at C5-R3 of RIXel array 130 (corresponding to the photosensitive element 84a at C5a-R3a in detector array 82a) for the permanent shape characterization record for image 12.

In the FIG. 6 example, each of the other three photosensitive elements 84a in array 82a on which light energy in spot or zone 63 is incident (i.e., those at C6a-R3a, C5a-R4a, and C6a-R4a) will be compared to the respective photosensitive elements 84b of array 82b that are partially juxtaposed to those photosensitive elements 84a. Thus, the signal output of element 84a at C6a-R3a will be compared to the respective output signals of the partially juxtaposed elements 84b at C5b-R2b, C6b-R2b, C5b-R3b, and C6b-R3b; the signal output of element 84a at C5a-R4a will be compared to the respective output signals of the partially juxtaposed elements 84b at C4b-R3b, C5b-R3b, C4b-R4b, and C5b-R4b; and the signal output of element 84a at C6a-R4a will be compared to the respective output signals of the partially juxtaposed elements 84b at C5b-R3b, C6b-R3b, C5b-R4b, and C6b-R4b. In all of these comparisons in the FIG. 6 example, the intensity signal produced by the photosensitive element 84b at C5b-R3b will be the highest. Thus, that high-intensity signal will be used for the RIXel data base 130 positions 131 corresponding not only with photosensitive element 84a at C5a-R3a in detector array 82a, as described above, but also with the photosensitive elements 84a at C6a-R3a, C5a-R4a, and C6a-R4a in detector array 82a.

On the other hand, comparison of the intensity signal output of photosensitive element 84a at C7a-R5a of detector array 82a in FIG. 6 to the four (4) partially juxtaposed photosensitive elements 84b at C6b-R4b, C7b-R4b, C6b-R5b, or C7b-R5b would not find a greater intensity signal from any of those four (4) photosensitive elements 84b. Therefore, the intensity signal output of the photosensitive element 84a at C7a-R5a would be the one considered for recording in the space 131 at C7-R5 in the RIXel data base 130, not the signal from any of the four (4) partially juxtaposed elements 84b. If that selected intensity signal meets or exceeds the threshold intensity, it will be the intensity I recorded in that space 131 at C7-R5 in the RIXel array 130.

Therefore, as can be seen from the description above, a small array (e.g., 16×16) can be used for detecting and recording the high intensity shape characterization data by using two juxtaposed detector arrays 82a, 82b with their respective photosensitive elements 84a, 84b partially offset in virtual relation to each other with reference to the filtered pattern 60. This arrangement allows unambiguous detection of spots or zones 63 of high intensity light energy by capturing energy of such spots or zones 63 that straddle one or more photosensitive element boundaries 92, 94, 96, 98 in one detector array 82a with one or more partially juxtaposed photosensitive elements 84b in the other detector array 82b. This offset, virtual juxtaposed use of two detector arrays 82a, 82b facilitates very rapid detection of high intensity light energy 62 concentrated in spots or zones 63 at particular locations in the filtered pattern 60, even if the photosensitive elements 84a, 84b are larger in area than the spot or zone 63 sizes. Disadvantages of this arrangement include inability to discriminate between very closely spaced high intensity spots or zones, inability to determine precise shapes of such high energy spots or zones 63, and recording high intensity values from such spots or zones in multiple spaces 131 in RIXel array 130 representing larger areas of the filtered pattern 60 than the spots or zones 63 really cover in circumstances where such high intensity spots or zones 63 straddle boundaries between photosensitive elements 84a. However, such disadvantages are not significant to this application. It is important to capture such shape characterizing light energy concentrations or distributions and recording them with location information in a consistent, reproducible, and searchable manner., but close correlation of such high intensity zones to actual area size that they occupy in the filtered pattern is not so important.

Actually, this invention can be used with just one detector array 82a, especially in the preferred embodiment of FIG. 1, in which the Fourier transform pattern 32 is filtered through a slit 52, which diffracts the filtered light. Such diffraction tends to disperse light energy rather than concentrating it into spots. Still, significantly more preciseness is provided by the two offset, juxtaposed detector arrays 82a, 82b with insignificantly additional processing to compare and select the intensity I as described above. For that matter, even more preciseness could be provided by more than two offset, juxtaposed detector arrays, such as three or four, especially if even smaller arrays, such as 8×8 arrays, are used.

The selection of the highest intensity signals during the comparison of partially juxtaposed photosensitive elements 84a, 84b, as described above, can be done in a number of ways that are well within the capabilities of persons skilled in the art, such as routing the signal outputs of each photosensitive element 84a, 84b through a network of voltage comparator circuits or by software comparison and selection processes. Therefore, such details are not necessary for describing or understanding the invention. However, to facilitate the explanation of how the intensity output signals are used in this invention to characterize the image 12, 14, . . . , n by shape content, reference is now made to FIG. 7, again showing the two 16×16 detector arrays 82a, 82b to detect light energy at 11.25-degree angular increments 51 of rotation of the slit 52 for example, but not for limitation. As mentioned briefly above, the computer 100 gathers and coordinates intensity signals (I), which are indicative of shape content of the image 12 at the specific angular increments 51 of rotation (R) of the slit 52 as the rotor 54 spins on its axis 57. The rotation R information and related intensity I is put together in a "RIXel" data array 130, as will be explained in more detail below. Essentially, an information link 132 between the computer 100 and the image handling apparatus 20 handles signals between the computer 100 and the image handling apparatus 20. For example, the computer 100 can signal the image handling apparatus 20 to insert a particular image 12, 14, . . . , n into the optical characterizer 10. Signals from the image handling apparatus 20 can communicate the identity of the image 12 to the computer 100 and confirm that it has been inserted. The image identity can be an arbitrary number or any other symbol or information that can be associated by the computer 100 with the RIXel data arrays 130 and with information about the image 12 such as where it can be found, e.g., a URL address, data base address, library catalog number, owner, museum collection, or the like. With the image 12 identification in the computer 100, and as the rotor 54 rotates, an encoder 134 detects angular position of the slit 52 and sends a signal via a communication link 136 to the computer 100, which signal indicative of a particular angular rotation position R of the slit 52. The encoder 134 can be, for example, apparatus in which a photocell (not shown) detects light from an LED or other light source (not shown), which passes through the encoder holes 138 in the periphery of the rotor 54, as would be understood by a person skilled in the art. If the encoder holes 138 are spaced at 11.25-degree increments 51, the encoder 134 can send a signal via communication link 136 at each instant the rotor 54 rotates another 11.25 degrees. The computer 100 can use the signals from encoder 134 to trigger a read of intensity information I from the detector arrays 82a, 82b, or from a separate intensity signal processing circuit 150 between the detector arrays 82a, 82b and the computer 100, and to keep track of the angular rotation R of the slit 52 for each such intensity I reading. Alternatively, a separate rotation R signal processing circuit 140 could be used to calculate angular rotation position R of the slit 52 from encoder 134 signals and to output that rotation position R information of the slit 52 along with a signal to the computer 100 to read intensity I each time the rotor 54 turns another 11.25 degree angular increment, or, for that matter, each time the rotor 54 turns any desired angular increment. The encoder holes 138 do not have to match the desired angular increments of rotation R at which intensity I is to be read by computer 100. Either the computer 100 or the microprocessor 140 could be programmed to keep track of rotation speed, i.e., angular velocity, and rotation position R with any encoder hole 138 spacing and to generate intensity read signals at any desired angular increments of rotation R. Therefore, controls could be provided on either the signal processing circuit 140 or in the computer 100 to vary the angular increments of rotation R of the slit 52 at which intensities I are read. It is convenient and simple, however, to place the encoder holes 138 at the desired angular increments of rotation R, such as for mass production of image characterizer apparatus 10 after a desired angular increment has been determined. Of course, the smaller the angular increments of rotation R at which intensities I are read, the more precise the data, but also the more data processing and storage capacity that will be needed. Again, the 11.25-degree increments of rotation R have been chosen for this example, because there are exactly 16 increments of 11.25 degrees in a 180-degree rotation of slit 52. Thus, sixteen (16) RIXel data arrays 130 for recording rotation R and intensities I will be obtained for each image 12. As mentioned above, only 180 degrees of slit 52 rotation is needed for each image, because the two half-segments of the slit 52 together make a 360-degree sweep of the filtered pattern 60 as the rotor 54 rotates through 180 degrees. Of course there are many other ways known to persons skilled in the art to keep track of angular rotation of a rotor, which could be used to implement this invention.

As described above, the filtered beam 61 passed by the slit 52 in spatial filter 50 is projected onto the offset detector arrays 82a, 82b, where the light energy distributions 62 are detected on a real time basis by individual photosensitive elements 84a, 84b of the detector arrays 82a, 82b. As also explained above, the intensity I for each RIXel in array 130 at each angular rotation increment R will be selected from the highest intensity of a corresponding photosensitive element 84a in detector array 82a or one of the four photosensitive elements 84b in detector array 82b, which are partially juxtaposed to the corresponding photosensitive element 84a.

Figure 8:
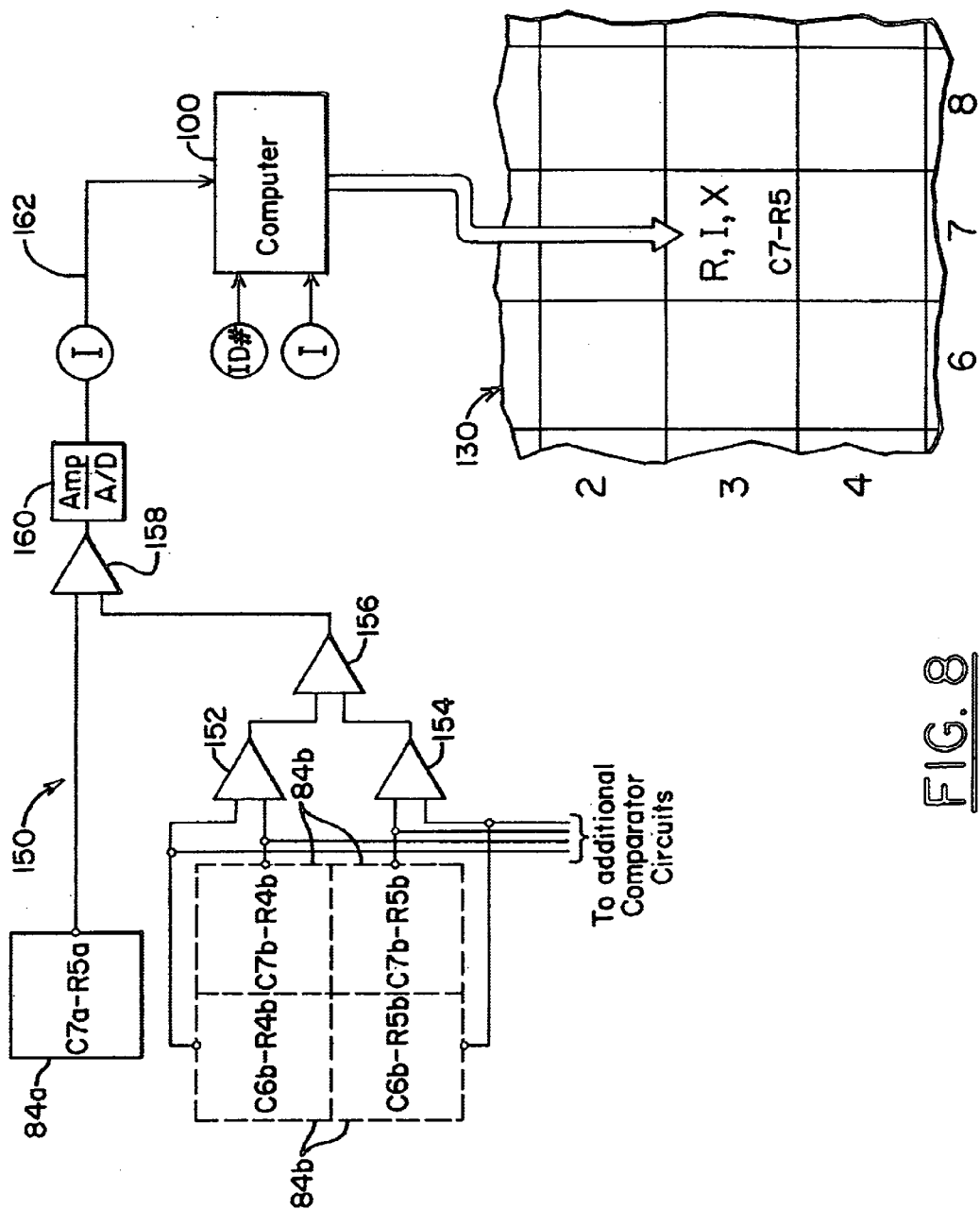
FIG. 8 is a diagrammatic illustration of an intensity signal comparator circuit for selecting intensity from among a photosensitive element of one detector array and four partially juxtaposed photosensitive elements of the other detector array for inclusion in the RIXel data base.

As mentioned briefly above, selecting the intensity I from either the photosensitive element 84a or one of the four partially juxtaposed photosensitive elements 84*b* can be done with software in the computer 100, but is preferably done with a separate intensity I signal processing circuit 150 positioned between the detector arrays 82*a*, 82*b* and the computer 100. As also mentioned briefly above, the intensity I image processing circuit 150 can be hard wired with an array of voltage comparator circuits 152, an example of which is illustrated diagrammatically in FIG. 8, or with a microprocessor circuit (not shown), as would be well-known to persons skilled in the art. As shown in FIG. 8, the intensity I associated with an example photosensitive element 84*a*, which is fed to the computer 100 to put into a corresponding RIXel space 131 in the RIXel array 130, is the highest intensity produced by the particular photosensitive element 84*a* or by any of the four partially juxtaposed photosensitive elements 84*b*. In the diagram of FIG. 8, the same photosensitive element 84*a* that was discussed earlier, i.e., in column 7*a*, row 5*a* (C7*a*-R5*a*) of the detector array 82*a* (FIGS. 5, 6, and 7) is used as an example. As explained above, before using the intensity signal produced by a photosensitive element 84*a*, which is usually a voltage level, for input to the RIXel data array 130, it is compared to the four photosensitive elements 84*b* in detector array 82*b* that are partially juxtaposed to the C7*a*-R5*a* element 84*a* in detector array 82*a*. As explained above, those four partially juxtaposed elements 84*b* are at C6*b*-R*b*, C7*b*-R4*b*, C6*b*-R5*b*, and C7*b*-R5*b* in detector array 82*b*. As shown in FIG. 8, the output voltages of two of the elements 84*b* at C6*b*-R4*b* and C7*b*-R4*b* are compared by comparator circuit 152, which outputs the highest of those two voltages, while the output voltages of the other two elements 84*b* at C6*b*-R5*b* and C7*b*-R5*b* are compared by comparator circuit 154, which outputs the highest of those two voltages. The respective output voltages of comparator circuits 152, 154 are then compared by comparator circuit 156, which outputs the highest voltage from the four individual elements 84*b*. That highest voltage from the elements 84*b* is then compared by the comparator circuit 158 to the output voltage produced by the element 84*a* (C7*a*-R5*a*). Whichever voltage is highest from among the single photosensitive element 84*a* at C7*a*-R5*a* and the clustered group of partially juxtaposed photosensitive elements 84*b* at C6*b*-R4*b*, C7*b*-R4*b*, C6*b*-R5*b*, and C7*b*-R5*b* will be the voltage that is sent to the amplifier and analog to digital (A/D) converter circuits 160 for processing and feeding as the intensity I via communication link 162 to the computer 100. Of course, there are other signal conditioning and processing components in the signal processing circuit 150, as are well-known and within the skills of persons skilled in the art, thus need not be discussed in detail for purposes of describing and understanding this invention. There are also other comparator sequences that can yield the same results. Also, it should be born in mind that the intensity I associated with the one photosensitive element 84*a* at C7*a*-R5*a* of detector array 82*a*, determined as discussed above, it is only one of the intensities I from the 16×16 detector array 82*a* being processed by the comparator circuit 150, as described above, and fed to the computer 100 via communications link 162 on a real time basis.

With continuing primary reference to FIG. 8 and secondary reference to FIG. 7, when A the computer 100 is signaled by encoder 134 and/or the rotation R signal processing circuit 140 that a desired angular increment of rotation R has been reached by the slit 52, the computer 100 reads the 256 intensities I from the comparator circuit 150, which are associated with all of the 256 photosensitive elements 84*a* in the 16×16 detector array 82*a*, and feeds them into the corresponding spaces or bins 131 of the RIXel data array 130. For example, the intensity I associated with the photosensitive element 84*a* illustrated in FIG. 8, i.e., at C7*a*-R5*a* of detector array 82*a*, is sorted by the computer 100 to be placed along with the corresponding rotational angle R into the column 7, row 5, RIXel space 131 in the 16×16 RIXel array 130. Likewise, the rest of the 256 intensities I associated with the rest of the 256 photosensitive elements 84*a* of the 16×16 detector array 82*a* (assuming they meet the threshold intensity discussed above) are sorted by the computer 100 and fed along with the rotation R, which is associated with those intensities 1, into the respective corresponding RIXel positions or bins 131 in the RIXel array 130. Therefore, for each chosen increment of angular rotation R of slit 52, there are 256 intensities I, which are sorted along with that particular rotation angle R into the RIXel data base 130. Again, when using 11.25-degree increments of rotation R, there are sixteen (16) RIXel arrays 130 for each image 12, and each of the sixteen (16) RIXel arrays 130 has one rotation orientation R with 256 possible intensities I associated with the 256 photosensitive elements 84*a* in detector array 82*a*.

However, mentioned briefly above, to avoid storing and handling useless data, the computer 100 only puts intensities I that meet a specific intensity threshold into the RIXel array 130. For example, referring to FIGS. 5 and 7, there are photosensitive elements 84*a* in detector array 82*a* that have little or no incident light energy, such as those in rows 0*a*, 1*a*, 14*a*, and 15*a* which are outside the filtered pattern 60. Also, possibly some of the photosensitive elements 84*a* between bands of light energy 62, such as, perhaps, those at C9*a*-R9*a* and C10*a*-R8*a*, have insufficient incident light energy 62 to be significant in characterizing shape content in the image 12. Therefore, there is no need to store such intensities I, or lack thereof, in the RIXel arrays 130. Consequently, for intensities I associated with photosensitive elements 84*a* in detector array 82*a* that are below a certain threshold intensity level, no R, I, or X data is put into the corresponding RIXel positions or bins 131 in RIXel array 130. For intensities I above the threshold, there are, according to the preferred implementation, four (4) levels into which the intensities I are categorized, i.e., 0, 1, 2, or 3. Therefore, only two (2) bits are needed to record each intensity I in RIXel array 130 i.e., 00, 01, 10, or 11. Of course, it is certainly within the bounds of this invention to utilize either more or fewer intensity I levels than four. However, more intensity I levels would require more bits. For example, eight (8) intensity I levels would require three (3) bits to record, and sixteen (16) intensity I levels would require four (4) bits.

The "X" data space in each RIXel is used for a distortion factor to aid in searching and finding images with almost, but not exactly, the same shape characteristics, or in finding images that have the same shape characteristics, but which might be shifted slightly in the field of view, as will be described in more detail below. However, the "X" data space could also be a flag used for some other purpose in data base searching or for higher rotation R precision or for higher intensity I precision. In the preferred, but not essential, implementation of this invention, the "X" can have up to four (4) values—0, 1, 2, 3, so it could be stored with two (2) bits of data information.

In the preferred implementation, the R value in the RIXel has four (4) bits to encode rotation R, which is sufficient for the 16 rotation R increments of 11.25 degrees each, in 180 degrees of rotation. Two (2) bits are used to encode the intensity I, as explained above, and two (2) bits are used to encode the X distortion factor or other flag usage, as also explained above. Therefore, each RIXel has just eight (8) bits, i.e., one (1) byte of information. Further, there are 256 RIXels, i.e., 256 possible bytes of information in each RIXel array 130, and there is one (1) RIXel array 130 for each of the sixteen (16) 11.25-degree increments of rotation R for each image 12. Therefore, it takes a maximum of 4,096 bytes to characterize one image 12 for shape content according to the preferred, but not essential, implementation of this invention, when 16×16 detector arrays 82a, 82b, 11.25-degree increments of rotation R of slit 52, and 16×16 RIXel arrays 130 are used.

As mentioned briefly above, the "X" space in the RIXel is preferably used as a distortion factor, which can be assigned to RIXels in the RIXel array 130 that are otherwise unused or unfilled due to intensity I below the threshold intensity level, in order to provide several different searchable levels of distortion in the searchable data. Therefore, if a searcher has an image for which he/she wants to find a match, but, in a search of the data base, cannot find a matching image from among the RIXel information stored for images 12, 14, . . . , n in the data base when using exact RIXel information, then the searcher may widen the search to look for inexact matches by specifying a different X value in the RIXels.

Figure 9A:
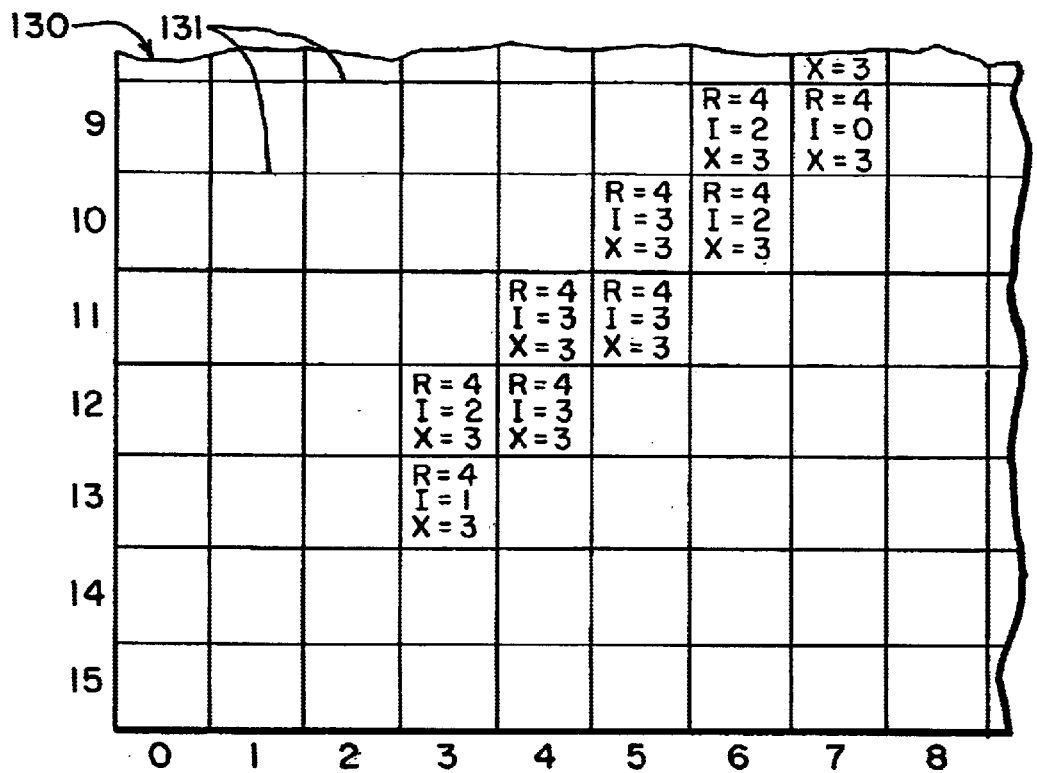
FIGS. 9a–b illustrate a portion of the RIXel data base with spaces filled with rotation, intensity, and distortion information for precise searching and with additional spaces filled with different distortion value flags for less precise searching.
Figure 9B:
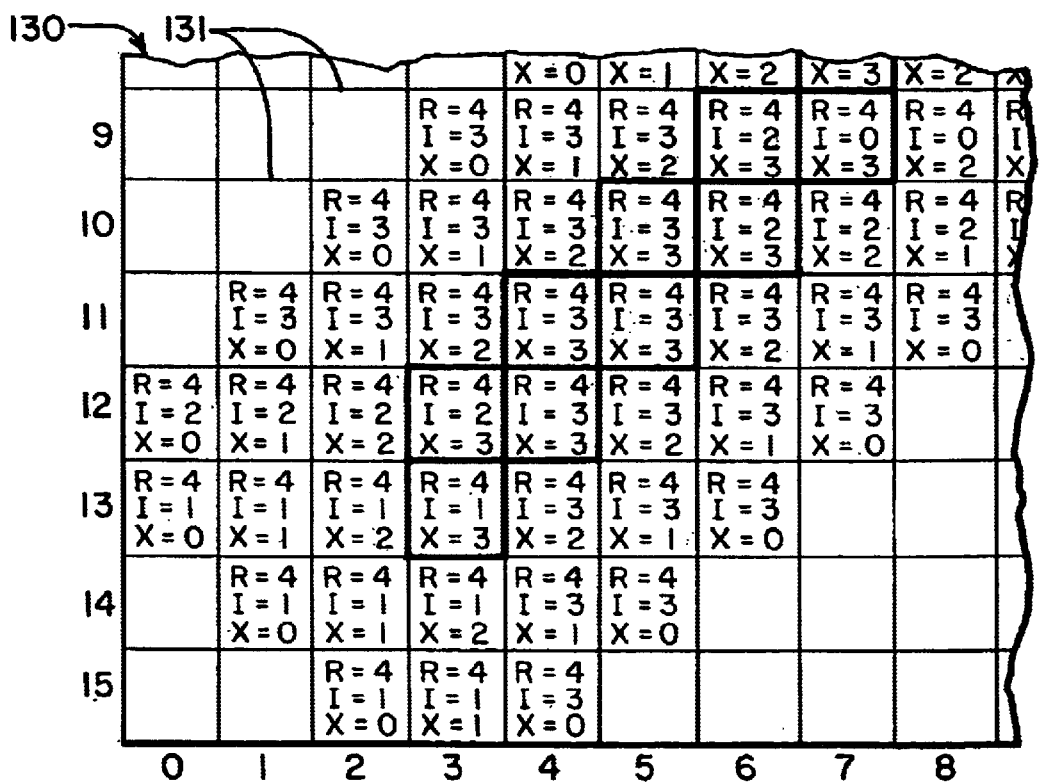

To illustrate this feature, reference is now made primarily to FIGS. 9a and 9b, with secondary reference to FIGS. 7 and 8. In FIG. 9a, a portion of the RIXel array 130, comprising primarily columns 0–8, rows 9–15, are illustrated with example RIXel values R, I, and X in several of the RIXel positions or spaces in the RIXel array 130. In this example, some of the RIXel positions or spaces in the array 130 are empty, because the intensities I associated with the corresponding photosensitive elements 84a in detector array 82a did not meet the minimum intensity threshold. In other words, there was little or no light energy incident on those corresponding photosensitive elements 84a or any of the partially juxtaposed photosensitive elements 84b of detector array 82b. Therefore, the computer 100 initially made no RIXel entries in those spaces or positions in array 130, leaving all of columns 0, 1, 2, 8 in rows 9, 10, 11, 12, 13, 14, 15; column 3, rows 9, 10, 11, 14, 15; column 4, rows 9, 10, 13, 14, 15; column 5, rows 9, 12, 13, 14, 15; column 6, rows 11, 12, 13, 14, 15, and column 7, rows 10, 11, 12, 13, 14, 15 empty. Now, examining more closely those example RIXel spaces or positions in RIXel array 130 for which intensities I were high enough to be recorded, i.e., at least as high as the threshold, there are R, I, and X values entered for each such RIXel space. In the example, R=4 in all the spaces filled, because the intensities I for this example RIXel array 130 come from light energy bands 62 in one filtered pattern 60, when the slit 52 is at one discrete rotation angle R, such as at a 45-degree angular orientation, as illustrated in FIG. 7. From the discussion above, a 45-degree angular orientation is four (4) 11.25-degree angular increments from a vertical starting orientation. Thus, R=4 for each intensity I value at that 45-degree orientation of slit 52, so R=4 is entered in each RIXel space 131 for which there is a recordable intensity 1. When the slit 52 rotates another 11.25-degree increment to 56.25 degrees, a new RIXel array 130 will be filled with new intensity I values. However, for the FIG. 9a example, the slit 52 orientation is 45 degrees, so R=4 for each RIXel for which intensity I is high enough to be recorded.

The recorded intensity levels I for the FIGS. 9a and 9b example are illustrated arbitrarily as varying from R=0 to R=3, i.e., in four (4) different intensity I level categories. The distortion factors X are all listed at the highest accuracy level, i.e., X=3, because these filled RIXels are based on the exact intensities I that were produced by the photosensitive elements 84a or 84b in detector arrays 82a, 82b, as explained above. Thus, X=3 indicates highest level of accuracy, i.e., the least distortion.

To appreciate the problem, consider, for example, an original image 12 having been characterized for shape content according to the invention, as described above and, further, the RIXel characterizations of such shape content having been stored in the RIXel array 130 of FIG. 9a. The RIXel array 130 for rotation R=4 in FIG. 9a is stored in a data base together with the other RIXel arrays for rotations R=1–3 and 5–16 for the image 12 and with a unique image identifier number (ID#), which can be associated with a source location address where the image 12 can be found. Consider also that a user has a copy of the image 12, but wants to know where the original is located. However, the copy has the image shifted slightly up or down, or left or right, in the field of view. Never-the-less, the user puts the copy of the image into the optical image characterizer 10 of this invention and obtains RIXel data that characterizes the shape content of the copy. But for the shift of the copy image in the field of view, the RIXel information of the characterized shape content of the copy would be the same, or very nearly the same, as the RIXel information of the characterized shape content of the original image 12.

However, such shift of the copy image in the field of view causes different RIXel spaces 131 in the RIXel array 130 for the copy to be filled, i.e., perhaps shifted one or several RIXel spaces left, right, up, or down, in relation to the original image 12 RIXels shown in FIG. 9a. Thus, when the RIXel characterizations of shape content of the copy (i.e., the reference image) is used to search the data base for precise RIXel match to the RIXel information stored in the data base for the original image 12, i.e., at the X=3 distortion level, the RIXel data of the original image 12 in FIG. 9a, being in slightly different RIXel array 130 columns and rows than the corresponding image copy RIXel information, might not be identified as a match in the search.

To solve this problem, when the RIXel data for the original image 12 is loaded into the RIXel arrays 130, the computer 100 can be programmed to also fill some of the previously unfilled RIXel spaces 131 in RIXel arrays 130 with the same rotation R values and intensity I values, as illustrated in FIG. 9a, but with lesser "X" values, i.e., more distortion. See, for example, FIG. 9b, where the originally filled RIXel spaces 131, thus those with the X=3 values are outlined more heavily to aid in visualization of where those originally filled RIXel spaces are positioned. Then, as illustrated in FIG. 9b, the computer 100 has filled some of the previously empty RIXel spaces, 131 to the extent of three spaces 131 horizontally and three spaces 131 vertically from the closest originally filled spaces 131, with R, I, and X RIXel values.

Specifically, in the FIG. 9b illustration, each newly filled RIXel space 131 still maintains the same rotation R=4, so that the new RIXel information is still searched in relation to RIXel values from that angular orientation of the slit 52, i.e., at the 45-degrees orientation. However, each additional RIXel space 131 that is removed vertically or horizontally from an originally filled space 131 is assigned a step lower X value, i.e., increasing distortion, the farther the RIXel space 131 is removed from an original filled RIXel space 131. Thus, where the originally filled RIXel spaces 131 have X=3 distortion values, the newly filled RIXels that are one space 131 removed from an originally filled RIXel space 131 have X=2. Two spaces 131 removed from an originally filled 131 space have X=1, and three spaces 131 removed have X=0. The intensity I values assigned into the new RIXel spaces 131, which have the different distortion values X=2, 1, or 0, are generally the same as close-by original intensity I values, although specific algorithms for assigning I values in filling new RIXel spaces 131 can vary. The idea is to be able to search and find the same, or nearly the same, RIXel intensity I patterns for a particular rotation R, even if the spatial locations of the RIXels that store those intensity I values are slightly offset in the RIXel array 130. Thus, the user in the example above, who may not have found a match for the image copy by searching for more precise RIXel data (i.e., for RIXels in which X=3), could then specify a less precise search. Such a less precise search could look for matches of the same R and I values, but with different X, i.e., distortion, values, for example, with X=4 or X=1 or X=0. A match of RIXel information might be found for the copy image characterization of shape content using X=4 or X=1 or X=0, where no match was found using the more precise X=3, thereby enabling the user to still access identification and location information for the original image 12.

Even if the scanned copy of the original image 12 is not shifted in the field of view in the copy, it is probably not realistic to expect that all RIXels for the original image 12 stored in a data base can be matched. Thus, the searcher may be enabled by the search software to specify desired levels of RIXel matching. For example, a user may look for a match of, say, 70 percent of the RIXels and to get the identifier information for all original images 12, 14, . . . , n for which 70 percent of the RIXels were matched in the search. If the search returns too many matches at the 70 percent level, the user could do another search specifying a higher, or more precise, match level, such as, reporting only identifying information for images for which, say, 80 percent or 90 percent of the RIXels match.

The RIXel information for an image 12 can be distributed by the computer 100 to build a shape vector data base 170 in any number of arrangements and with any subject or variety of other information, as illustrated in FIG. 1, depending on what criteria users may desire for storing, searching, and retrieving information about the images 12, 14, . . . , n. For example, one date base structure 172 may list the RIXel data under a specific image identifier (such as an ID#, of an image) along with location information for the image (such as URL address where the image 12 is located in the Internet), format and resolution information (such as rotation increments, detector array sizes, and the like), color information (which can be provided manually or by an automated optical color characterizer (not part of this invention)), texture information (which can also be derived from other automated optical texture characterizer (e.g., the U.S. patent application Ser. No. 09/326,362)), and the like. Another data base arrangement 174 may list identifier numbers or designations of all images 12, 14, . . . , n by RIXel characterizations of shape content.

The foregoing description is considered as illustrative only of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention as defined by the claims which follow. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed include:

1. A method of characterizing shape content of an optical image, comprising:

transforming the image from spatial domain to Fourier domain by passing light energy that comprises the image through a Fourier transform lens to create an optical Fourier transform pattern of the light energy in a focal plane of the lens positioned on an optic axis at a focal distance from the lens;

spatially filtering the Fourier transform pattern in the focal plane to pass light energy from only a discrete portion of the Fourier transform pattern positioned radially outward from, and at a discrete angular orientation about, the optic axis;

projecting the filtered light energy from said discrete portion of the Fourier transform pattern back into a spatial domain optical image that corresponds to a portion of the shape content of the optical image;

detecting intensities of the light energy at multiple, divers locations in the spatial domain optical image of said portion that corresponds to the shape content;

recording the intensities of light energy detected at said multiple, divers locations in the spatial domain optical image that corresponds to said portion of the shape content; and repeating said spatially filtering of the Fourier transform pattern, projecting the light energy, detecting intensities, and recording intensities, but for multiple other discrete portions of the Fourier transform pattern positioned radially outward from, and at different angular orientations about, the optic axis.

2. The method of claim 1, including recording information that identifies the position of each discrete portion of the Fourier transform pattern from which the detected light energy intensities propagate.

3. The method of claim 1, including recording information that identifies the divers locations of said intensities detected in the spatial domain optical image that corresponds to the portion of the shape content for each of said discrete portions of the Fourier transform pattern.

4. The method of claim 1, wherein the discrete portions of the Fourier transform pattern include elongated areas that extend radially outward in their elongated directions from the optic axis at different, specific angular orientations with respect to the optic axis.

5. The method of claim 4, including spatially filtering the Fourier transform pattern with an elongated slit in an opaque rotor, which is rotatable about the optic axis.

6. The method of claim 4, including spatially filtering the Fourier transform pattern with a spatial light modulator.

7. The method of claim 4, wherein the elongated areas are elongated rectangles.

8. The method of claim 4, wherein the discrete portions of the Fourier transform pattern include any desired shape.

9. The method of claim 8, wherein the discrete portions of the Fourier transform pattern include an elongated rectangle.

10. The method of claim 8, wherein the discrete portions of the Fourier transform pattern include an oval.

11. The method of claim 26, including recording said intensities at 11.25-degree angular increments of rotation with respect to the optic axis.

12. The method of claim 11, including recording said intensities at sixteen (16) 11.25-degree angular increments of rotation through 180 degrees with respect to the optic axis.

13. The method of claim 2, including recording information that identifies angular orientation of each discrete portion in relation to the optic axis.

14. The method of claim 3, including detecting pixels of the optical image of the portion of the shape content in a two-dimensional pixel array, and recording information that identifies the divers locations of said intensities according to locations of the pixels where such intensities occur in the pixel array.

15. The method of claim 14, including detecting the pixels with a two-dimensional photodetector array positioned in the spatial domain optical image.

16. An optical image shape content characterizer, comprising:

a Fourier transform lens having a focal plane at a focal distance on an optic axis and a focal point where the optic axis intersects the focal plane;

a spatial filter positioned in the focal plane of the Fourier transform lens and centered on the optic axis, said spatial filter being capable of selectively passing light energy sequentially through a plurality of discrete portions of the focal plane that are located radially outward from, and at different angular orientations about, the optic axis and blocking light energy from passing through the rest of the focal plane;

a spatial light modulator with an associated light source, said spatial light modulator being addressable to produce an optical image with light energy from the light source, said spatial light modulator being positioned to project the optical image through the Fourier transform lens to form a Fourier transform pattern of the light energy in the optical image in a Fourier domain at the focal plane of the Fourier transform lens;

photodetector apparatus positioned at a focal distance from the focal plane where the light energy from the discrete portions of the focal plane passed by the spatial filter refocuses in spatial domain, said photodetector apparatus being capable of detecting light energy intensity patterns in the light energy that refocuses in the spatial domain; and a computer connected to the photodetector apparatus for recording patterns of light energy intensity in the spatial domain for light energy passed from each discrete portion of the focal plane.

17. The optical shape content characterizer of claim 16, wherein the spatial filter includes a rotor with a slit positioned in the focal plane of the Fourier transform lens to rotate about the optic axis.

18. The optical shape content characterizer of claim 16, wherein the spatial filter includes a spatial light modulator.

19. The optical shape content characterizer of claim 16, wherein the photodetector apparatus includes a two-dimensional array of individual photosensitive elements that detect light energy intensity at respective distinct pixel locations in the spatial domain light energy patterns.

20. The optical shape content characterizer of claim 19, wherein the computer is programmed to collect and record pixel intensities of light energy in the light energy intensity patterns in the spatial domain along with locations of the pixels in relation to each other and along with information identifying the discrete portion of the focal plane through which the light energy passed to reach the photodetector apparatus.

21. The optical shape content characterizer of claim 20, wherein the computer also is programmed to record identifying information about the optical image in conjunction with a collection of the pixel intensities of light energy in the spatial domain and the information identifying the discrete portion for each of the multiple discrete portions through which the spatial filter allows light to pass when the pixel intensities of the light energy in the spatial domain are detected.

22. The optical shape content characterizer of claim 21, including a database array configured to have a plurality of two-dimensional bin arrays so that there is at least one of the bin arrays for each of the discrete portions through which the spatial filter allows light energy to pass, and wherein each of the two-dimensional bin arrays has a bin corresponding to the individual photosensitive elements in the photodetector, and wherein each bin receives and stores the information identifying the discrete portion of the focal plane through which the light energy passed to reach the photodetector apparatus and the intensity of the light energy detected by the corresponding photosensitive element.

23. The optical shape content characterizer of claim 22, wherein the information identifying the discrete portion of the focal plane through which the light energy passed to reach the photodetector apparatus includes information that indicates angular orientation of that discrete portion in relation to the optic axis.

* * * * *